United States Patent
Simpson

(10) Patent No.: US 12,555,068 B2
(45) Date of Patent: Feb. 17, 2026

(54) SYSTEM AND METHOD FOR IMPROVING ITEM SCAN RATES IN DISTRIBUTION NETWORK

(71) Applicant: United States Postal Service, Washington, DC (US)

(72) Inventor: Ryan J. Simpson, Vienna, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 18/601,324

(22) Filed: Mar. 11, 2024

(65) Prior Publication Data
US 2024/0211869 A1    Jun. 27, 2024

Related U.S. Application Data

(63) Continuation of application No. 17/449,156, filed on Sep. 28, 2021, now Pat. No. 11,961,040.
(Continued)

(51) Int. Cl.
| | |
|---|---|
| *G06Q 10/08* | (2024.01) |
| *G06K 7/14* | (2006.01) |
| *G06N 5/022* | (2023.01) |
| *G06Q 10/083* | (2023.01) |
| *G06V 10/40* | (2022.01) |
| *G06Q 10/0833* | (2023.01) |
| *G06V 30/10* | (2022.01) |

(52) U.S. Cl.
CPC ....... *G06Q 10/0838* (2013.01); *G06K 7/1413* (2013.01); *G06K 7/1456* (2013.01); *G06N 5/022* (2013.01); *G06V 10/40* (2022.01); *G06Q 10/0833* (2013.01); *G06V 30/10* (2022.01)

(58) Field of Classification Search
CPC .......... G06Q 10/0838; G06Q 10/0833; G06V 10/40; G06V 30/10; G06K 7/1413; G06K 7/1456; G06N 5/022
USPC ......................................................... 705/341
See application file for complete search history.

(56) References Cited

U.S. PATENT DOCUMENTS

| | | |
|---|---|---|
| 5,880,451 A | 3/1999 | Smith et al. |
| 6,363,484 B1 | 3/2002 | Cordery et al. |
| | (Continued) | |

OTHER PUBLICATIONS

International Search Report and Written Opinion dated Mar. 2, 2022, in International Application No. PCT/US2021/052384.
(Continued)

*Primary Examiner* — Daniel A Hess
(74) *Attorney, Agent, or Firm* — Knobbe, Martens, Olson & Bear, LLP

(57) ABSTRACT

The present disclosure relates to a system and method for improving scan rates of an item in a distribution network. The system may include an item scan database storing item scan datasets containing barcodes, item datasets and optical character recognition (OCR) labels datasets and a processor in data communication with the item scan database. The processor may detect an item barcode with an item orientation so as to output correct orientation information of the item. The processor may also extract available barcode information from the detected item barcode based on the correct orientation information of the item. The processor may further reconstruct a correct barcode from the extracted available barcode information and one or more of the item scan datasets.

21 Claims, 16 Drawing Sheets

Related U.S. Application Data

(60) Provisional application No. 63/085,858, filed on Sep. 30, 2020.

(56) References Cited

U.S. PATENT DOCUMENTS

| | | |
|---|---|---|
| 7,387,251 B2 | 6/2008 | Baker et al. |
| 9,836,635 B2 | 12/2017 | Negro et al. |
| 11,961,040 B2 * | 4/2024 | Simpson ................ G06N 5/022 |
| 2012/0106787 A1 | 5/2012 | Nechiporenko et al. |
| 2013/0193211 A1 | 8/2013 | Baqai et al. |
| 2016/0110703 A1 | 4/2016 | Herring et al. |
| 2018/0300519 A1 * | 10/2018 | Trajkovic ................ G06K 7/14 |
| 2023/0196527 A1 * | 6/2023 | Zhang ................... G06V 10/25 |
| | | 382/274 |

OTHER PUBLICATIONS

International Preliminary Report on Patentability dated Mar. 28, 2023, in International Application No. PCT/US2021/052384.

Suh et al. "Robust Shipping Label Recognition and Validation for Logistics by Using Deep Neural Networks", 2019 IEEE International Conference on Image Processing (ICIP), IEEE, Sep. 22, 2019 (Sep. 22, 2019), pp. 4509-4513.

\* cited by examiner

| INDEX OF FIRST DIGIT | LENGTH | NAME |
|---|---|---|
| 1 | 2 | BARCODE IDENTIFIER |
| 3 | 3 | SERVICE TYPE IDENTIFIER |
| 6 | 6 or 9 | MAILER ID |
| 12 or 15 | 9 or 6 | SEQUENCE NUMBER |
| 21 | 11 | DELIVERY POINT ZIP CODE |

SYSTEM AND METHOD FOR IMPROVING ITEM SCAN RATES IN DISTRIBUTION NETWORK

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. patent application Ser. No. 17/449,156, filed Sep. 28, 2021, which claims priority to and the benefit of Provisional Application No. 63/085,858 filed on Sep. 30, 2020 in the U.S. Patent and Trademark Office, the entire contents of each of which are incorporated herein by reference.

BACKGROUND

The described technology generally relates to item processing, and in particular to a system and method for improving item scan rates in a distribution network.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for processing items in a distribution network.

One aspect is a system for improving scan rates of an item in a distribution network, comprising: an item scan database storing item scan datasets containing barcodes, item datasets and optical character recognition (OCR) labels datasets; and a processor in data communication with the item scan database and configured to: detect an item barcode with an item orientation so as to output correct orientation information of the item; extract available barcode information from the detected item barcode based on the correct orientation information of the item; and reconstruct a correct barcode from the extracted available barcode information and one or more of the item scan datasets.

In the above system, the item scan database comprises one or more of: an item electronic record database configured to store one or more of electronic records of items; an item label data database configured to store data for one or more of item labels; an item layout data database configured to store data for one or more of item layouts; an item shipping and service file database configured to store data for one or more of item shipping and service files; a barcode format database configured to store various types of barcode formats; an item tracking database configured to store data relating to tracking of one or more of items; and an item processing equipment database configured to store data relating to various types of item processing equipment.

In the above system, in detecting the item barcode, the processor is configured to run a rotated bounding box barcode detection algorithm. In the above system, in extracting the barcode information, the processor is configured to run an optical character recognition (OCR) algorithm. In the above system, the processor is configured to use OCR results to extract the available barcode information. In the above system, in reconstructing the correct barcode, the processor is configured to run a statistical analysis tool algorithm. In the above system, the barcode information comprises a mailer ID associated with the item, and wherein processor is further configured to: identify shipper information and shipping date from the mailer ID; retrieve one or more candidate barcodes that match the identified shipper information and shipping date; compare candidate barcodes with information from the available information of the barcode; and identify the correct barcode from a comparison result.

In the above system, the barcode information comprises a sequence number associated with the item, and wherein processor is further configured to: identify recipient information from the sequence number; identify shipping date of the item; retrieve one or more candidate barcodes that match the identified recipient information and shipping date; compare candidate barcodes with information from the available information of the barcode; and identify the correct barcode from a comparison result. In the above system, the barcode information comprises a service type identifier associated with the item, and wherein processor is further configured to: identify a service type from the service type identifier; identify shipping date of the item; retrieve one or more candidate barcodes that match the identified service type and shipping date; compare candidate barcodes with information from the available information of the barcode; and identify the correct barcode from a comparison result.

In the above system, the barcode information comprises a delivery point ZIP code section associated with the item, and wherein processor is further configured to: identify a delivery point ZIP code from the delivery point ZIP code section; identify shipping date of the item; retrieve one or more candidate barcodes that match the identified delivery point ZIP code and shipping date; compare candidate barcodes with information from the available information of the barcode; and identify the correct barcode from a comparison result.

In the above system, in extracting the barcode information, the processor is configured to run an optical character recognition (OCR) algorithm and extract the available barcode information using OCR results. In the above system, the barcode information comprises a mailer ID associated with the item, and wherein processor is further configured to: identify shipper information and shipping date from the mailer ID; retrieve one or more candidate barcodes that at least partially match the identified shipper information and shipping date; compare candidate barcodes with information from the available information of the barcode; and identify the correct barcode from a comparison result.

In the above system, the barcode information comprises a sequence number associated with the item, and wherein processor is further configured to: identify recipient information from the sequence number; identify shipping date of the item; retrieve one or more candidate barcodes that at least partially match the identified recipient information and shipping date; compare candidate barcodes with information from the available information of the barcode; and identify the correct barcode from a comparison result.

In the above system, the barcode information comprises a service type identifier associated with the item, and wherein processor is further configured to: identify a service type from the service type identifier; identify shipping date of the item; retrieve one or more candidate barcodes that at least partially match the identified service type and shipping date; compare candidate barcodes with information from the available information of the barcode; and identify the correct barcode from a comparison result.

In the above system, the barcode information comprises a delivery point ZIP code section associated with the item, and wherein processor is further configured to: identify a delivery point ZIP code from the delivery point ZIP code section; identify shipping date of the item; retrieve one or more candidate barcodes that at least partially match the identified delivery point ZIP code and shipping date; compare candidate barcodes with information from the available information of the barcode; and identify the correct barcode from a comparison result.

Another aspect is a method of improving scan rates of an item in a distribution network, comprising: storing, at an item scan database, item scan datasets containing barcodes, item datasets and optical character recognition (OCR) labels datasets; and detecting, at a processor, an item barcode with an item orientation so as to output correct orientation information of the item; extracting, at the processor, available barcode information from the detected item barcode based on the correct orientation information of the item; and reconstructing, at the processor, a correct barcode from the extracted available barcode information and one or more of the item scan datasets.

In the above method, the item scan database comprises one or more of: an item electronic record database configured to store one or more of electronic records of items; an item label data database configured to store data for one or more of item labels; an item layout data database configured to store data for one or more of item layouts; an item shipping and service file database configured to store data for one or more of item shipping and service files; a barcode format database configured to store various types of barcode formats; an item tracking database configured to store data relating to tracking of one or more of items; and an item processing equipment database configured to store data relating to various types of item processing equipment.

In the above method, the detecting comprises running a rotated bounding box bar code detection algorithm. In the above method, the extracting comprises running an optical character recognition (OCR) algorithm. In the above method, the extracting comprises using OCR results to extract the available barcode information. In the above method, the reconstructing comprises running a statistical analysis tool algorithm. In the above method, the barcode information comprises a mailer ID associated with the item, and wherein running the statistical analysis tool algorithm comprises: identifying shipper information and shipping date from the mailer ID; retrieving one or more candidate barcodes that match the identified shipper information and shipping date; comparing candidate barcodes with information from the available information of the barcode; and identifying the correct barcode from a comparison result.

In the above method, the barcode information comprises a sequence number associated with the item, and wherein running the statistical analysis tool algorithm comprises: identifying recipient information from the sequence number; identifying shipping date of the item; retrieving one or more candidate barcodes that match the identified recipient information and shipping date; comparing candidate barcodes with information from the available information of the barcode; and identifying the correct barcode from a comparison result.

In the above method, the barcode information comprises a service type identifier associated with the item, and wherein running the statistical analysis tool algorithm comprises: identifying a service type from the service type identifier; identifying shipping date of the item; retrieving one or more candidate barcodes that match the identified service type and shipping date; comparing candidate barcodes with information from the available information of the barcode; and identifying the correct barcode from a comparison result.

In the above method, the barcode information comprises a delivery point ZIP code section associated with the item, and wherein running the statistical analysis tool algorithm comprises: identifying a delivery point ZIP code from the delivery point ZIP code section; identifying shipping date of the item; retrieving one or more candidate barcodes that match the identified delivery point ZIP code and shipping date; comparing candidate barcodes with information from the available information of the barcode; and identifying the correct barcode from a comparison result.

In the above method, the extracting comprises running an optical character recognition (OCR) algorithm and extracting the available barcode information using OCR results. In the above method, the barcode information comprises a mailer ID associated with the item, and wherein running the statistical analysis tool algorithm comprises: identifying shipper information and shipping date from the mailer ID; retrieving one or more candidate barcodes that at least partially match the identified shipper information and shipping date; comparing candidate barcodes with information from the available information of the barcode; and identifying the correct barcode from a comparison result.

In the above method, the barcode information comprises a sequence number associated with the item, and wherein running the statistical analysis tool algorithm comprises: identifying recipient information from the sequence number; identifying shipping date of the item; retrieving one or more candidate barcodes that at least partially match the identified recipient information and shipping date; comparing candidate barcodes with information from the available information of the barcode; and identifying the correct barcode from a comparison result.

In the above method, the barcode information comprises a service type identifier associated with the item, and wherein running the statistical analysis tool algorithm comprises: identifying a service type from the service type identifier; identifying shipping date of the item; retrieving one or more candidate barcodes that at least partially match the identified service type and shipping date; comparing candidate barcodes with information from the available information of the barcode; and identifying the correct barcode from a comparison result.

In the above method, the barcode information comprises a delivery point ZIP code section associated with the item, and wherein running the statistical analysis tool algorithm comprises: identifying a delivery point ZIP code from the delivery point ZIP code section; identifying shipping date of the item; retrieving one or more candidate barcodes that at least partially match the identified delivery point ZIP code and shipping date; comparing candidate barcodes with information from the available information of the barcode; and identifying the correct barcode from a comparison result.

Another aspect is a non-transitory computer readable medium storing instructions, when executed by one or more processors, configured to perform a method of improving scan rates of an item in a distribution network, the method comprising: storing, at an item scan database, item scan datasets containing barcodes, item datasets and optical character recognition (OCR) labels datasets; detecting, at a processor, an item barcode with an item orientation so as to output correct orientation information of the item; extracting, at the processor, available barcode information from the detected item barcode based on the correct orientation information of the item; and reconstructing, at the processor, a correct barcode from the extracted available barcode information and one or more of the item scan datasets.

In the above medium, the detecting comprises running a rotated bounding box bar code detection algorithm, wherein the extracting comprises running an optical character recognition (OCR) algorithm and extract the available barcode information using OCR results, and wherein the reconstructing comprises running a statistical analysis tool algorithm.

Any of the features of an aspect is applicable to all aspects identified herein. Moreover, any of the features of an aspect is independently combinable, partly or wholly with other aspects described herein in any way, e.g., one, two, or three or more aspects may be combinable in whole or in part. Further, any of the features of an aspect may be made optional to other aspects. Any aspect of a method can comprise another aspect of a system for improving scan rates of an item in a distribution network. Furthermore, any aspect of a system for improving scan rates of an item in a distribution network can be configured to perform a method of another aspect. Furthermore, any aspect of a method can comprise another aspect of a system for improving scan rates of an item in a distribution network. Moreover, any aspect of a system for improving scan rates of an item in a distribution network can be configured to perform a method of another aspect.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIG. 9 is an example barcode format to be used in a distribution network according to some embodiments.

DETAILED DESCRIPTION

Figure 1A:
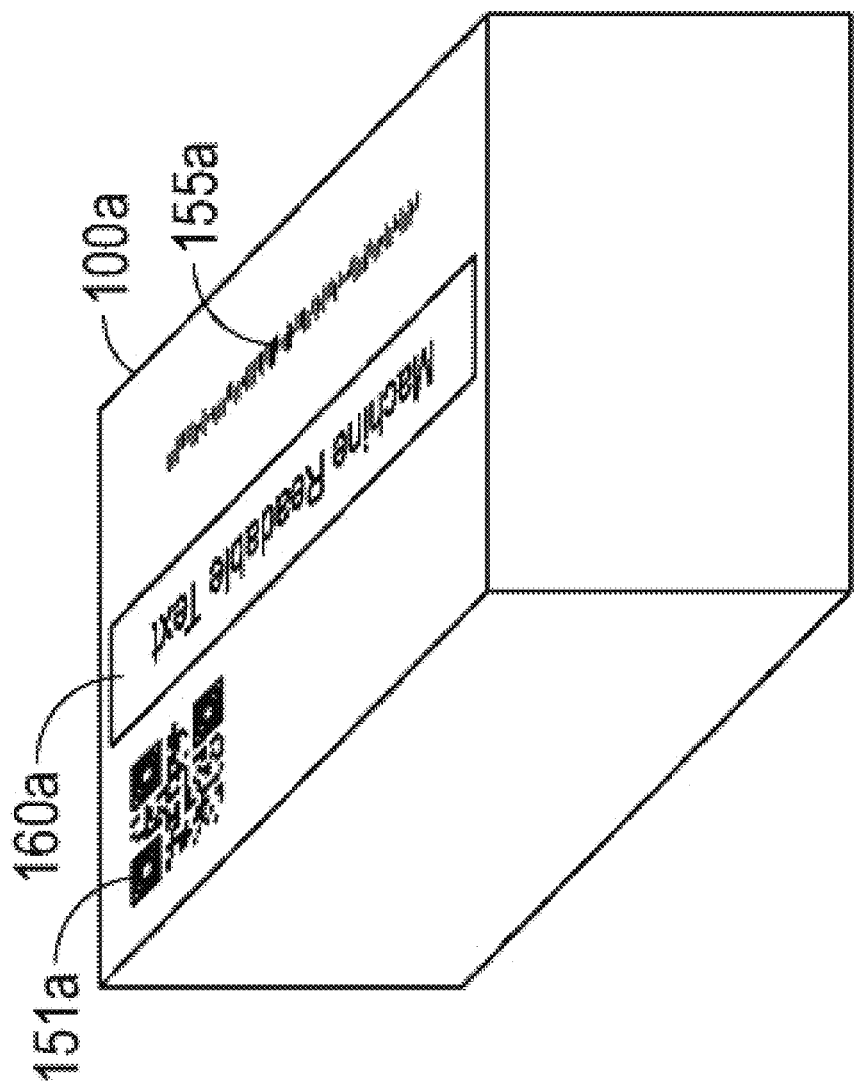
FIGS. 1A, 1B, and 1C show examples of items and information that may be scanned and processed in a distribution system.

Provided herein are various embodiments of systems and methods for improving item scan rates in a distribution network. Embodiments described herein can significantly increase scan visibility and augment customer visibility data, for example, by identifying a barcode even if some portion of the barcode is damaged so that the functionality of computing devices such as an item processing system is significantly improved. Thus, various embodiments can reduce customer dissatisfaction and improve item scan performance.

The distribution network may have many items in process or transit at any time. Gains in efficiency can be realized by automating identification and handling of items in the distribution network. Generally, when a sender desires to ship an item, the item is provided to the distribution network. When the item is onboarded, inducted, or taken into the distribution network, the network needs to identify the item. This can be done manually or using optical character recognition (OCR), or item processing systems, automatic processes, and other identification techniques. The information can be provided from a label on a distribution item, from a user interface, etc. After identifying the item, the distribution network can then produce a unique, computer readable identifier for the item, which is used for handling events and tracking of the item throughout the distribution network.

Distribution systems employ the use of barcodes and other printed/encoded information for use in electronically scanning, sorting and managing distribution items. As items are manually sorted, processed by operators, processed on item processing equipment including automated processing computer readable codes can be read, scanned, captured and/or process. Many methods and devices for processing barcodes are available. These may include one-dimensional barcode scanning devices, such as handheld barcode readers. Other examples of barcode scanning devices and systems include photo diode pen type readers, laser barcode scanners, charge coupled diode (CCD) scanners, and camera based barcode scanners.

As items are processed in an item distribution network, items having computer readable codes thereon pass through multiple handling events. During some of the events, the computer readable code, such as a barcode, can be damaged, smudged, portions go missing, etc. In some embodiments, and item shipper may have inadequately or incorrectly placed a computer readable code on an item. The item processing equipment may not be able to read or parse a computer readable code that is damaged, etc. Manual reading of the barcode is slow and inefficient, and can slow down the item processing equipment when an item needs to be removed from it for manual analysis. Systems and methods described herein use machine learning, deep learning, or artificial intelligence to estimate or predict the complete or full information from a damaged or partial code.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary from figure to figure. The illustrative embodiments described in the detailed description, drawings, and claims are not meant to be limiting. Some embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

As used here, the term "item" or "items" may refer to flats, letters, parcels, residual mail, and the like. Although the present disclosure describes systems and devices for image processing related to articles of mail, such as letters and flats, it will be apparent to one of skill in the art that the disclosure presented herein is not limited thereto. For example, the described technology may have application in a variety of manufacturing, assembly, distribution, or sorting applications which include processing images including personal or sensitive information at high rates of speed and volume.

Mail pieces or parcel items are sorted and the information (e.g., addresses, types of items, barcode, etc.) about them are scanned in an item processing facility. A processing facility can use automated processing equipment to sort items. An item processing facility may receive a very high volume of items, such as letters, flats, parcels, or other objects which must be sorted and/or sequenced for delivery. Sorting and/or sequencing may be accomplished using item processing equipment which can scan, read, or otherwise interpret a destination end point from each item processed. The destination end point may be encoded in a computer readable code, such as a barcode printed on or affixed to the item. In some embodiments, the destination end point may be read by taking an image of the item and performing an optical character recognition (OCR) process on the image, and determining the delivery end point from the OCR'd address. In some embodiments, the item processing equipment can apply a computer readable code that encodes the delivery end point and may print or spray the computer readable code onto the item.

An item distribution system or distribution network, such as the United States Postal Service (USPS) or other shipping or item delivery service, may deliver items, such as letters, flats, parcels, packages, and bulky items to a plurality of delivery points or destinations. The USPS will be used in the described technology as an exemplary distribution network to describe some exemplary embodiments, but the described technology is not limited thereto. When referencing generically to any of the services listed above or any item distribution service in addition to those listed above, the phrase "item distribution service," "delivery service," or "distribution system" will be used to indicate such generalities. The terms mail or mailpiece may be used to illustrate exemplary embodiments, but these terms are not intended to be limiting.

The distribution network may comprise multiple levels. For example, the distribution network may comprise regional distribution facilities, hubs, and unit delivery facilities, or any other desired level. A nationwide distribution network, for example, may comprise one or more regional distribution facilities having a defined coverage area (such as a geographic area), designated to receive items from intake facilities within the defined coverage area, or from other regional distribution facilities. The regional distribution facility can sort items for delivery to another regional distribution facility, or to a hub level facility within the regional distributional facility's coverage area. A regional distribution facility can have one or more hub level facilities within its defined coverage area. A hub level facility can be affiliated with a few or many unit delivery facilities, and can sort and deliver items to the unit delivery facilities with which it is associated. In the case of the USPS, the unit delivery facility may be associated with a ZIP Code. The unit delivery facility receives items from local senders, and from hub level facilities or regional distribution facilities. The unit delivery facility also sorts and stages the items intended for delivery to destinations within the unit delivery facility's coverage area.

Figure 1B:
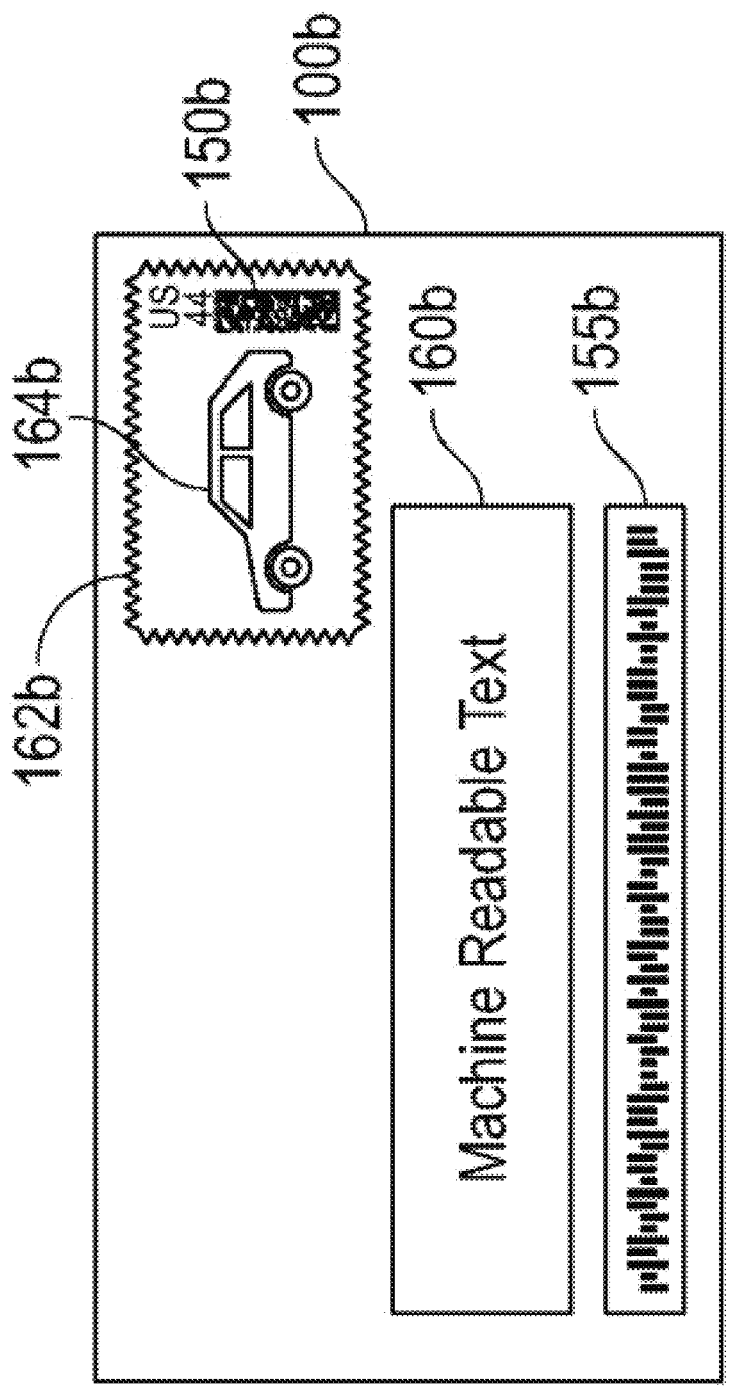
Figure 1C:
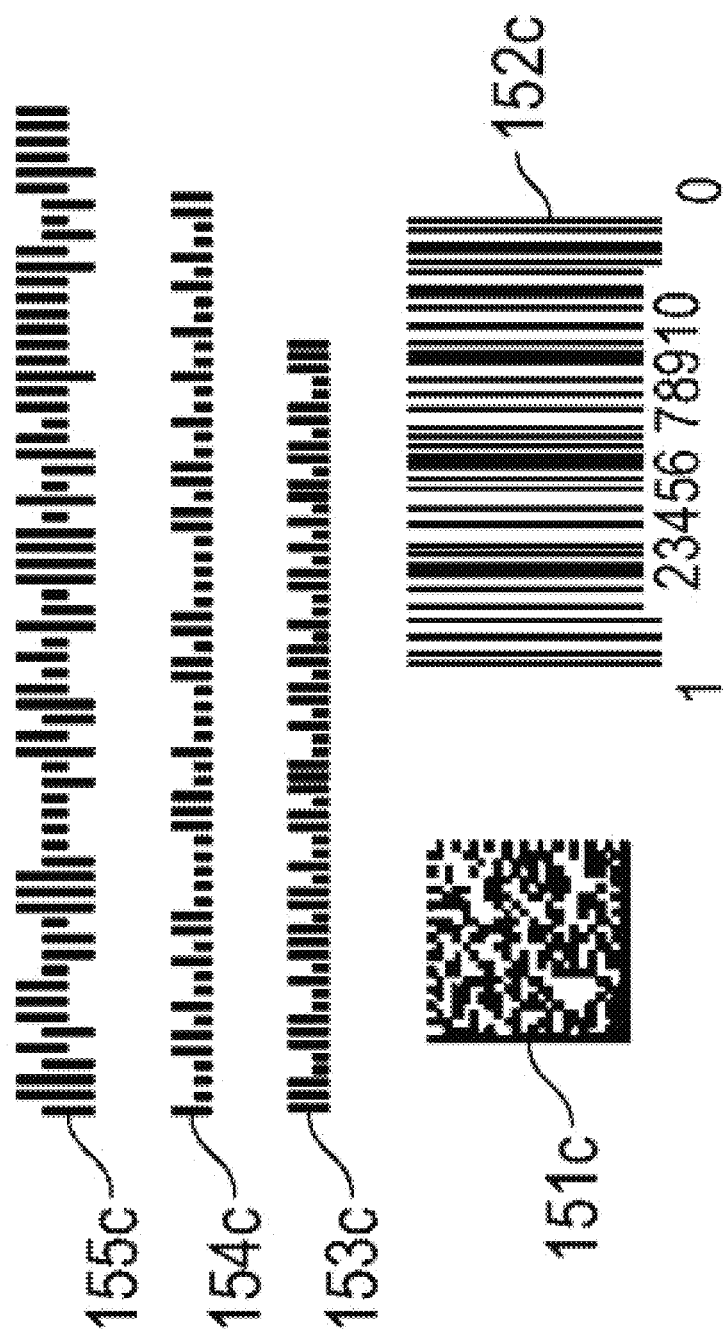

FIGS. 1A, 1B, and 1C show examples of items and information that may be scanned and processed in a distribution system. FIG. 1A shows an item 100a, such as a package, that may be a distribution item and may be processed by a scanning system. Machine readable information may be affixed to and/or printed on the item 100a. For example, the item 100a may have a barcode 151a, such as a Quick Response (QR) code 151a. Another barcode 155a, such as a four state barcode 155a (e.g., an Intelligent Mail® barcode) may also be affixed to the item 100a. The item 100a may also include machine readable text 160a that may be scanned and processed by the scanning system. As shown in FIG. 1A, the item 100a may be a package or other object of any shape or size. Although FIG. 1A shows that all of the codes/text (151a, 155a and 160a) are provided on the same side of the item 100a, the present disclosure is not limited thereto. For example, at least one of the codes/text (151a, 155a and 160a) can be provided on another different side of the item 100a. Furthermore, although two barcodes (151a, 155a) and one machine readable text 160a are provided on the item 100a in FIG. 1A, more or less codes/text can also be provided depending on the embodiment. This applies to FIG. 1B.

FIG. 1B shows an example of another item, such as a mail piece 100b. Like the item 100a, a variety of types of machine readable information may be affixed to the mail piece 100b. For example, machine readable text 160b and a four state barcode 155b may be affixed and/or printed on the mail piece 100b. The mail piece 100b may further include a stamp 162b that may include a variety of type of information that may be scanned and processed to decode information from the stamp 162b. For example, the stamp 162b may include a barcode 150b or any other machine readable text. In some embodiments, the stamp 162b may include an image 164b from which information associated with the image may be determined. The image 164b may also be affixed and/or printed to other portions of the mail piece 100b. The information extracted from the mail piece 100b or item 100a (FIG. 1A) may include a variety of different types of information associated with the item 100a, such as information associated with identifying the item 100a, tracking the item 100a, a destination of the item 100a, a source or sender of the item 100a, sorting data, routing information regarding the item 100a, and the like.

FIG. 1C shows examples of various different types of barcodes that may be affixed to and/or printed on item 100a or a mail piece 100b that may be scanned and decoded to extract information regarding the item 100a or mail piece 100b. For example, a barcode may be a data matrix barcode 151c that may be affixed to and/or printed on an item 100a. The barcode may also be a width modulated bar code 152c. In addition, other barcodes such as two state barcodes 153c and 154c (e.g., PLANET or POSTNET barcodes) may be used. A barcode may also be a four state barcode 155c, such as an Intelligent Mail® barcode, and affixed to and/or printed on an item 100a or mail piece 100b. The barcodes shown in FIG. 1C are merely examples, and other type of barcodes may also be used.

It will be appreciated that while the items 100a and 100b may be depicted and/or described herein as distribution items, the systems and methods described herein may be applicable to any item that may include machine readable information affixed to and/or printed thereon. In addition, the systems and methods described herein may be used in conjunction with any object that may be imaged and processed to extract information regarding the item. For examples, objects may include envelopes, cartons, flats, crates, bins, and the like.

In the distribution network, a barcode scan is used for capturing data about the handling and movement of items across its expansive network of distribution centers and delivery units. This data is used to provide visibility to customers on the path of their item through the distribution network. However, the lack of a scan on a package can create significant challenges in a distribution network. For example, failure to provide scan data to a customer can lead to customer dis-satisfaction. Also, it can impact a shipping service company's ability to measure a package's service performance, as there is potential for lost packages and it can also impact a shipping service company's scan visibility percentages and national performance assessment (NPA) scores. In some embodiments, cameras on machines are used to capture barcodes. Barcodes that are smudged, cut off or wrapped around the packages cannot be read using barcode scanners as the full barcode is not in view of the camera. In some embodiments, scanners or other readers can be used, which may not be able to read the entire code under various circumstances.

Various embodiments provide a system and method for successfully reading a damaged barcode by matching barcode content with other distribution system data resources to identify the barcode even when only a portion of the barcode can be computer readable. The data resources may include, but not limited to, a label, a product layout, shipping and services file from a vendor, a barcode format repository in the distribution system as well as a product tracking repository application in the distribution system. In this way, item scan accuracy and scan rates can improve and customer visibility data can be augmented.

Figure 2:
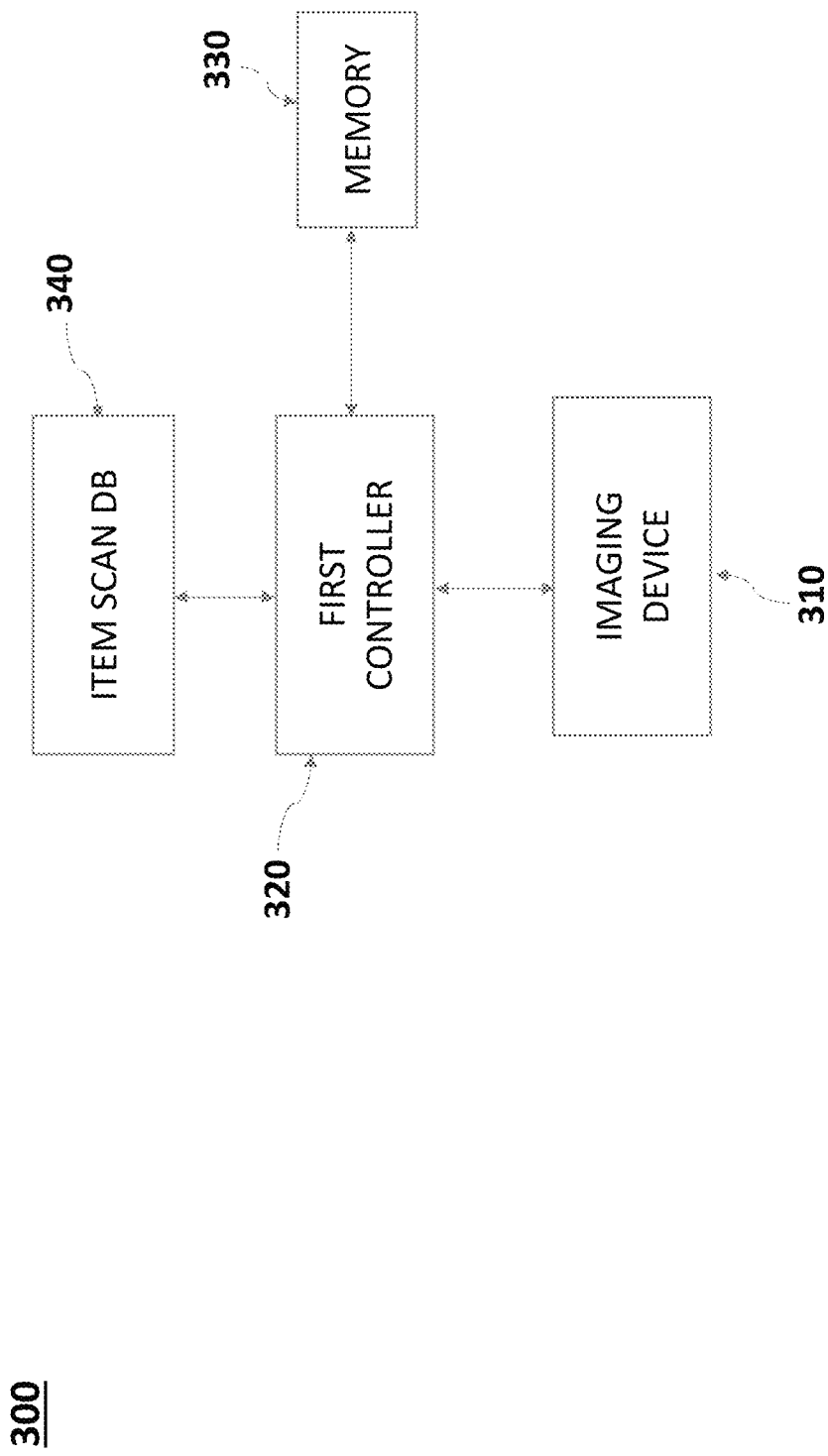
FIG. 2 is a block diagram of a data building system for improving item scan rates in a distribution network according to some embodiments.

FIG. 2 is a block diagram of a system 300 for improving item scan rates in a distribution network according to some embodiments. The system 300 may include an optical scanner (or a reader) 310, a first controller 320, a memory 330 and an item scan DB (or a package scan DB) 340. The elements 310-340 may be connected with each other either wirelessly or by wire. The elements 310-340 may directly or indirectly communicate data with each other. The system 300 shown in FIG. 2 is merely an example processing system, and certain elements may be modified or removed, two or more elements combined into a single element, and/or other elements or equipment may be added.

The imaging device 310 may capture the entirety of an item or a portion of the item. For example, the imaging device 310 may capture a label or a barcode provided on the item. In some embodiments, the imaging device 310 may capture a non-damaged barcode so that is fully computer readable. The imaging device 310 may also capture a partially damaged or partially missing barcode that may not be fully identifiable or may be at least partially identifiable.

The item scan DB 340 may store item scan data sets that can be used to clean, prepare and enhance an existing barcode, package data and optical character recognition (OCR) labels data sets.

The first controller 320 may communicate data with one or more of the imaging device 310, the memory 330 and the item scan DB 340 in order to improve item scan rates in a distribution network. The first controller 320 may include basic image processing, such as OCR. However, some images may be of poor quality, may require rotation or other processing to be analyzed, or may be of sufficient quality but show a label with damages (e.g., smudged, water damaged, ripped, torn, overwritten, etc.) obscuring the information of interest. The first controller 320 may be a specially configured image processing device for performing detailed image analysis to remove or adjust images requiring such additional processing to obtain the information of interest despite defects in the form or content of the image. For example, the first controller 320 may include specialized graphics libraries or machine learning models to extract information from an image of an item The first controller 320 may receive an OCR result for the image. The OCR result may include a binary, graphical, or text indicator of the portion of the code which was read/decoded from the image. The OCR result may include other information about the image such as rotation information, skew, color quality, resolution, image size, etc. The rotation information may be provided as a value identifying a quantity of rotation from a predetermined position. The predetermined position may be based on a standard orientation for the type of item shown in the image. For example, it may be a system standard to orient letters with the postage indicia in the upper right hand corner of the image.

The first controller 320 may detect an item bar code with any item orientation so as to output correct orientation information of items. In detecting the item barcode, the first controller 320 may run a rotated bounding box barcode algorithm (to be described later). The first controller 320 may also extract barcode information from item labels based on the correct orientation information of the items. In extracting the barcode information, the first controller 320 may run an OCR algorithm (to be described later). The first controller 320 may also reconstruct a correct barcode from incomplete bar code scans using OCR results and available extra item meta data. In reconstructing the correct barcode, the first controller 320 may run a statistical analysis tool algorithm (to be described later).

The first controller 320 may include a processor (not shown). The processor may be implemented as software or hardware as part of a dedicated server or computer. The processor may direct the operation of the first controller 320, including the interface and communication with the various other components of the system 300.

The memory 330 can store instructions for directing the first controller 320, the processor and various other components of the system 300. The memory 330 may also store information or data used for the processor to perform one or more of the above described operations. The memory 330 may store information or instructions used for the first controller 320 perform the above described operations to identify the content of a damaged barcode.

Figure 3:
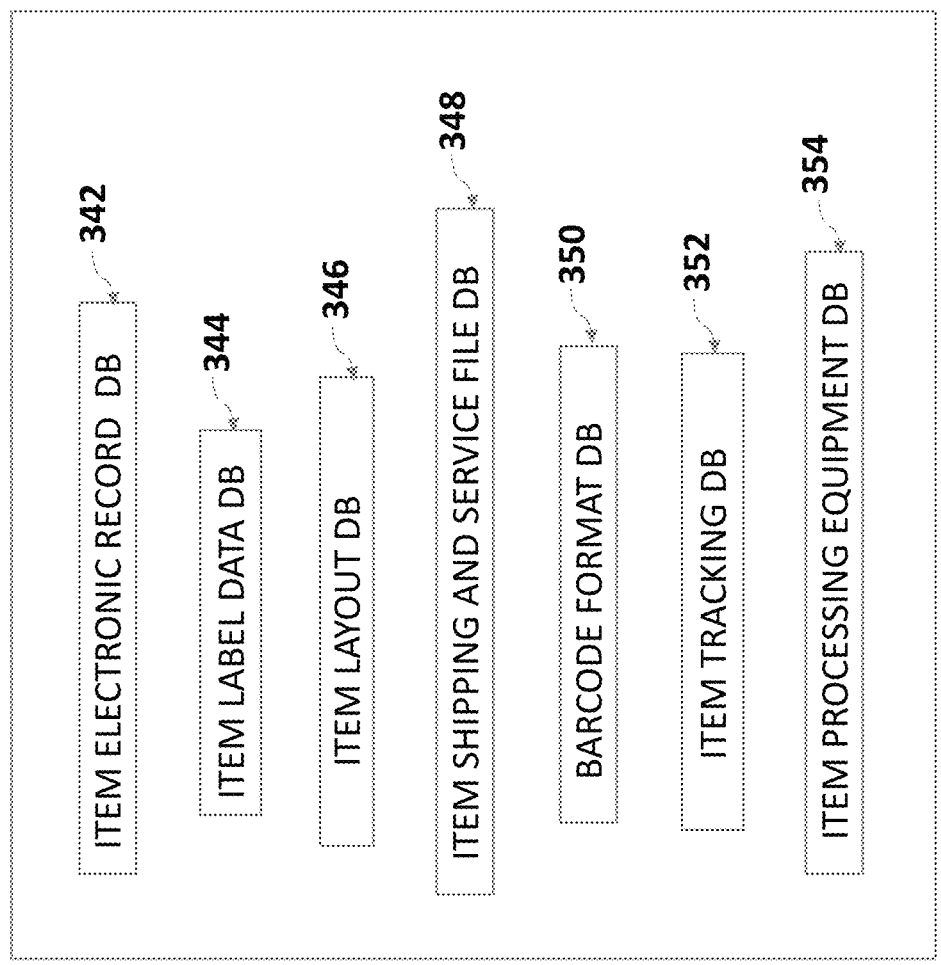
FIG. 3 is an example block diagram of the item scan DB storing data sets for improving item scan rates in a distribution network according to some embodiments.

FIG. 3 is an example block diagram of the item scan DB 340 storing data sets for improving item or package scan rates in a distribution network according to some embodiments. The DB 340 shown in FIG. 3 is merely an example item scan DB, and certain DBs may be modified or removed, two or more DBs combined into a single DB, and/or other DBs may be added.

As shown in FIG. 3, the item scan DB 340 may include, but not limited to, one or more of an item electronic record DB 342, an item label data DB 344, an item layout DB 346, an item shipping and service file DB 348, a barcode format DB 350, an item tracking DB 352, or an item processing equipment DB 354. The DBs 342-354 may communicate data with each other. Furthermore, one or more of the DBs 342-354 may continuously be updated with information that is directly or indirectly provided to the DBs 342-354.

One or more of the DBs 342-354 may communicate data with the first controller 320. Furthermore, one or more of the DBs 342-354 may communicate data with one or more of components of the distribution network, for example, a carrier terminal, an operator terminal or a clerk terminal (not shown) either wirelessly or by wire. The carrier terminal (such as a mobile delivery device (MDD) or other mobile device) may be used by a carrier to input data relating to item delivery or processing via the carrier terminal. The operator terminal or the clerk terminal may perform one or more of an item arrival scan, an "out for delivery" scan, or an item acceptance scan, and communicate scan data with one or more of the DBs 342-354.

At least one of the DBs 342-354 may be located at or near one or more of regional facilities or semi-regional facilities (not shown) in a distribution network. However, the present disclosure is not limited thereto, and one or more of the DBs 342-354 may be located anywhere in the distribution network. In some embodiments, one or more of the DBs 342-354 may be implemented with a network memory such as a cloud, or other device separately located from the elements 310-330.

The item electronic record DB 342 may store one or more of electronic records of items. The electronic records may include, but are not limited to, shipper information, item information (content, size, value, etc.), insurance information, type of class, tracking information, or any other information electronically stored in the distribution network in connection with the item. In some embodiments, the item electronic record DB 342 may receive the electronic records from the distribution network. In other embodiments, the item electronic record DB 342 may receive at least some of the electronic records from the imaging device 310.

The item electronic record DB 342 may communicate data with one or more of components of the distribution network, for example, a carrier terminal, an operator terminal or a clerk terminal (not shown) either wirelessly or by wire. The item electronic record DB 342 may additionally store information or data including, but not limited to, one or more of electronic records of items, various item scan data such as arrival scan data, out for delivery scan data, acceptance scan data, delivery scan data, etc.

The item label data DB 344 may store data for one or more of item labels. The item label data DB 344 may receive at least some of the item label data from the distribution network and/or the imaging device 310.

The item layout data DB 346 may store data for one or more of item layouts. The item layout data DB 346 may receive at least some of the item layout data from the distribution network and/or the imaging device 310.

The item shipping and service file DB 348 may store data for one or more of item shipping and service files. The item shipping and service file DB 348 may receive at least some of the item shipping and service files from the distribution network and/or the imaging device 310.

The barcode format DB 350 may store various types of barcode formats. In some embodiments, the barcode format DB 350 may store barcode formats for one or more of the following barcodes: one-dimensional barcode types (e.g., UPC barcode, EAN barcode, Code 39 barcode, Code 128 barcode, ITF barcode, Code 93 barcode, Codabar barcode, GS1databar barcode and MSI Plessey barcode) and two-dimensional barcodes (e.g., QR code, Datamatrix code, PDF417 code and Aztec code). Furthermore, although various embodiments are described with reference to an item barcode that is placed on a mail or an item for delivery, the present disclosure is not limited thereto and can be applied to non-mail barcodes (e.g., barcodes placed on products for sale, exhibit, or advertisement, etc.). Moreover, although various embodiments are described with reference to mail barcodes for USPS, the present disclosure is not limited thereto and can be used by other entities that make or ship products containing barcodes.

The item tracking DB 352 may store data relating to tracking of one or more of items. In some embodiments, the item tracking DB 352 may store information or data including, but not limited to, one or more of electronic records of items, various item scan data such as arrival scan data, out for delivery scan data, acceptance scan data, delivery scan data, etc.

The item processing equipment DB 354 may store data relating to various types of item processing equipment used in one or more of item processing facilities in a distribution network.

Figure 4:
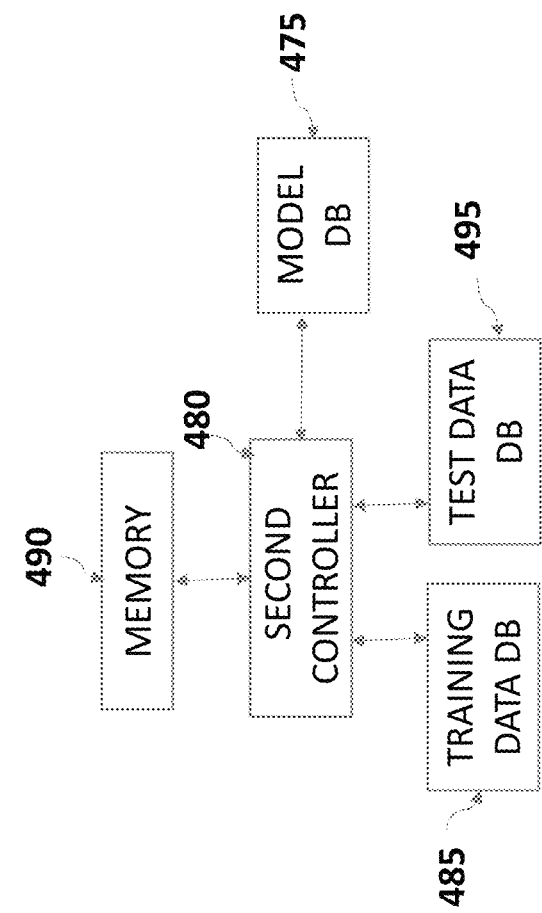
FIG. 4 illustrates an example image processing system for training a machine learning or deep learning model for improving item scan rates in a distribution network according to some embodiments.

FIG. 4 illustrates an example image processing system 50 for training a machine learning or deep learning model for improving item scan rates in a distribution network according to some embodiments. The image processing system 50 shown in FIG. 4 is merely an example image processing system, and certain elements may be modified or removed, and/or other elements or equipment may be added. The image processing system 50 may include a model DB 475, a training data DB 485, a test data DB 495, a second controller 480 and a memory 490.

The image processing system 50 may train one or more machine learning/deep learning models stored on the model DB 475 or the memory 490 using training data sets stored in the training data DB 485 and test data sets stored in the test data DB 495. The trained models may be used to improve item scan rates in a distribution network, for example, identifying the content of a barcode even if only a portion of the barcode is computer readable and the remaining portion is damaged or not fully computer readable.

The second controller 480 may communicate data with the model DB 475, the training data DB 485, the test data DB 495 and the memory 490. In some embodiments, at least one of the model DB 475, the training data DB 485, or the test data DB 495 may be built using one or more of the DBs 342-354 shown in FIG. 3. The second controller 480 may train a machine learning/deep learning model with training data sets stored in the training data DB 485 to improve item scan rates in a distribution network.

In some embodiments, the second controller 480 may generate an initial machine learning/deep learning model from existing machine learning/deep learning models relating to, for example, computer vision or image recognition. In other embodiments, the second controller 480 may generate from scratch an initial machine learning/deep learning model relating to, for example, computer vision or image recognition. The second controller 480 may generate the initial model using machine learning model building language and its libraries. The machine learning model building language may include, but is not limited to, Python, Java, R, C++, C, JavaScript, Scala or Julia. The second controller 480 may train the generated initial model with the training data sets stored in the training data DB 485 and test the trained model with the test data sets stored in the test data DB 495. The second controller 480 may store the trained and tested model in at least one of the memory 490 or the model DB 475. The second controller 480 may also store the "trained and tested" model (to be interchangeably used with "trained" model) therein.

The model DB 475 may store one or more trained models to be used to improve item scan accuracy and/or rates and to reduce the amount of manual code reading required in a distribution network. The trained models may be stored in a trained model section of the model DB 475. The model DB 475 may also store one or more non-trained models in a non-trained model section of the model DB 475. At least one of the non-trained models may be trained by the second controller 480 to be used to recognize a barcode even if some portion of the barcode is damaged, and the trained model may be stored in the model DB 475. In some embodiments, the model DB 475 may store only non-trained models and the trained models may be stored in the memory 490 and/or the second controller 480. In these embodiments, the second controller 480 may directly run the trained model(s) to improve item scan rates in a distribution network. In some embodiments, the trained models may be used to, fully recognize a barcode even if only a portion of the barcode is computer readable and the remaining portion is damaged or somehow not fully computer readable.

The training data DB 485 may store a plurality of sets of training data used to train one or more of initially non-trained models. The training data sets may include previously captured or retrieved images or data (such as item electronic records, item label data, item layouts, item shipping and service files, barcode formats, item tracking information and item processing equipment data) or images or data that are generally different from those images used to create the trained models. The training data sets may be generated by the first controller 320 shown in FIG. 2. The number of the training data sets may depend on the embodiments. For example, several thousand images may be used for training a machine learning or deep learning model for relatively simple geographical area information protocols. Furthermore, several million or more images may be used for training the machine learning or deep learning model for relatively complicated geographical area information protocols.

The test data DB 495 may store a plurality of sets of test data used to test an identified and trained model. The test data set may include previously captured or retrieved images or data (such as item electronic records, item label data, item layouts, item shipping and service files, barcode formats, item tracking information and item processing equipment data) or images or data that are generally different from those images used to create the trained models.

Datasets for training machine learning model can include a large number of scanned images or data described above. To generate the large number of images, an automated system can automatically generate a large number of scanned images of items. The images can then be used to train the machine learning algorithm. This test data may be generated by the first controller 320 shown in FIG. 2. Again, fewer numbers of test data sets may be used for testing a trained machine learning or deep learning model for relatively simple barcode protocols and more numbers of test data sets may be used for testing a trained machine learning or deep learning model for relatively complicated barcode protocols.

Figure 5:
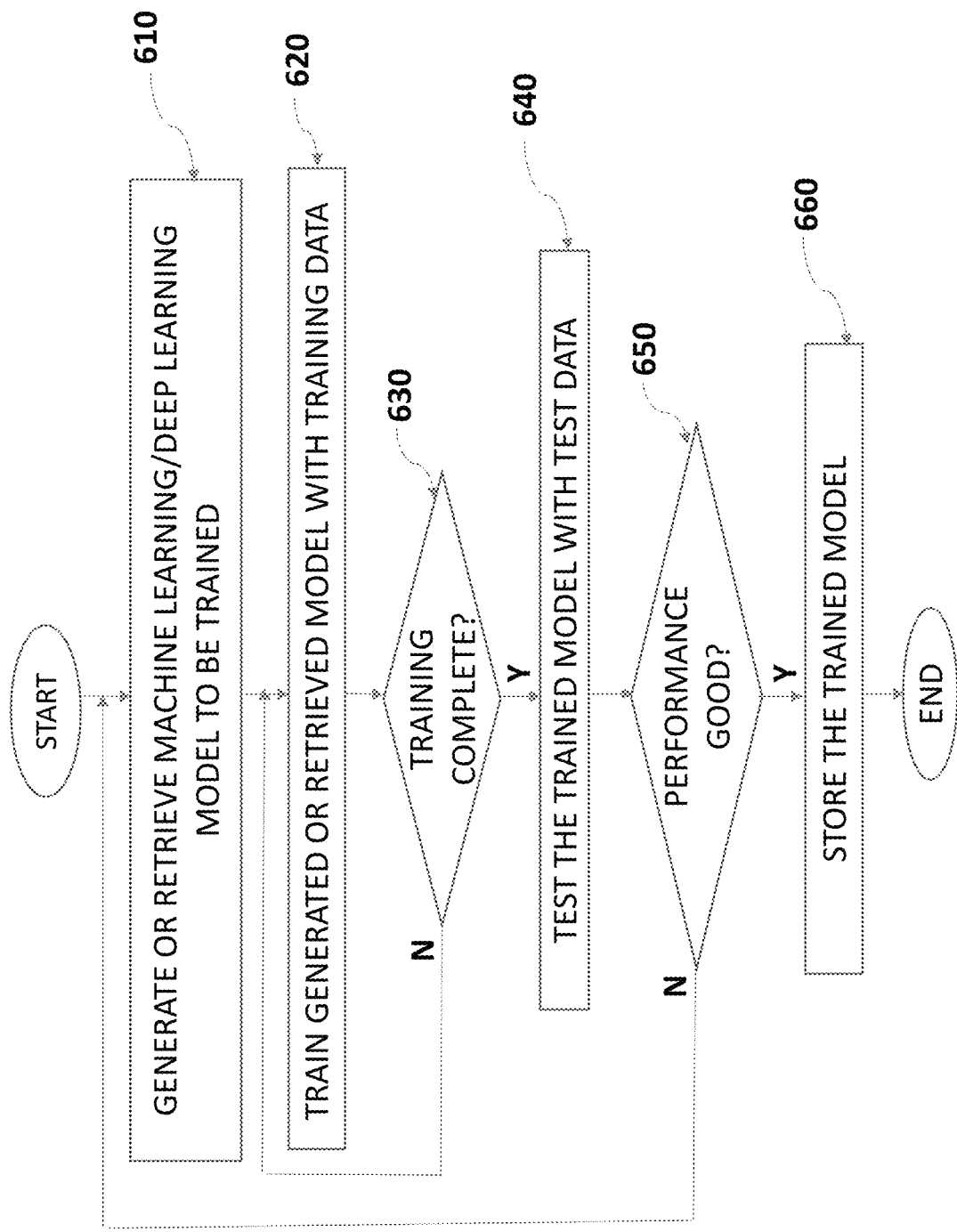
FIG. 5 is a process flow diagram of an exemplary method for training a machine learning or deep learning model for improving item scan rates in a distribution network according to some embodiments.
Figure 6:
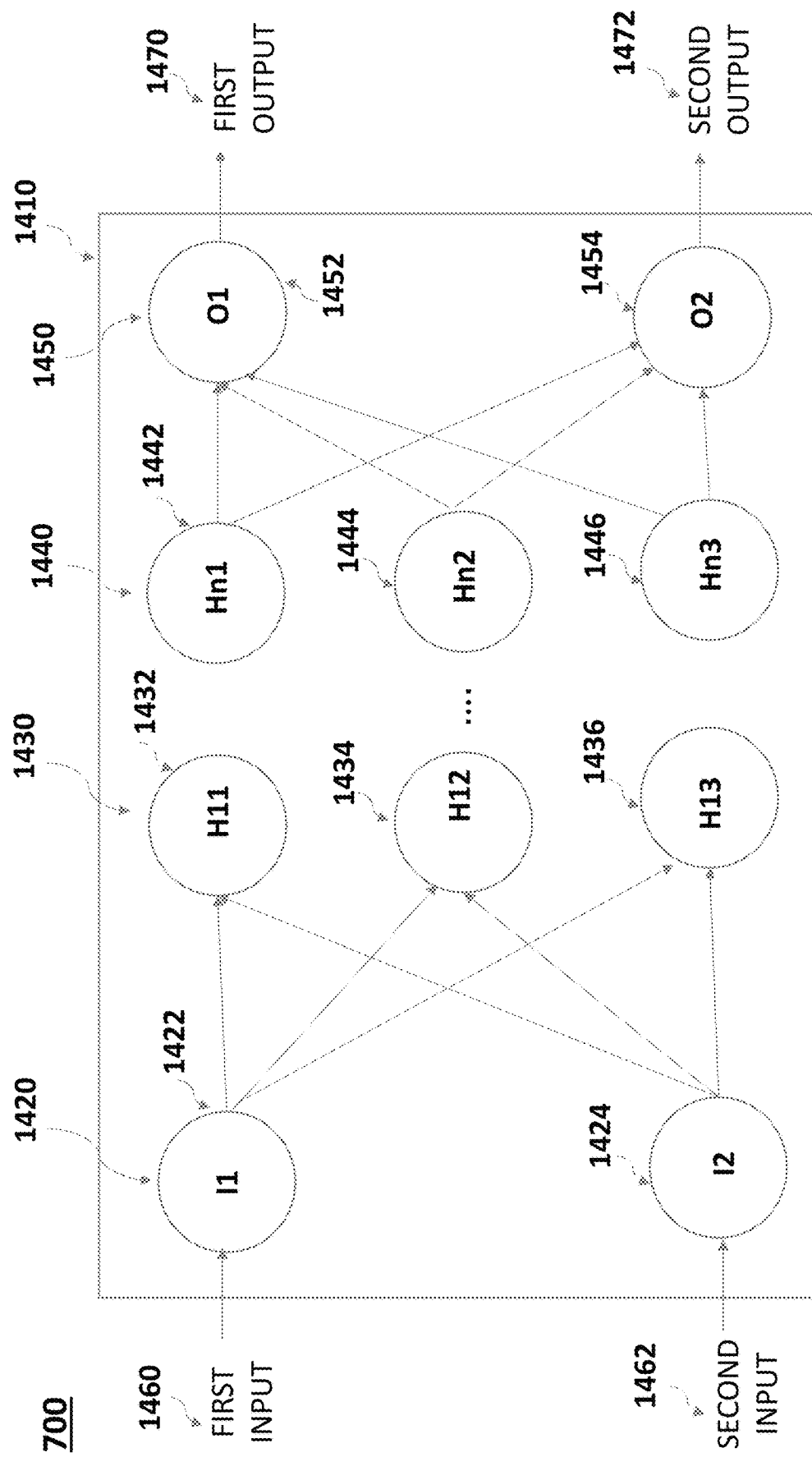
FIG. 6 is a node diagram illustrating an example neural network for performing the machine learning or deep learning operation of FIG. 5.

FIG. 5 is a process flow diagram 600 of a method for training a machine learning or deep learning model for improving item scan rates in a distribution network according to some embodiments. The process flow diagram 600 may be implemented by a computing device such as the second controller 480 shown in FIG. 4. FIG. 5 is merely an example process flow diagram for training a machine learning or deep learning model, and certain states elements may be removed, other states added, two or more states combined or one state can be separated into multiple states depending on the specification and requirements. FIG. 6 is a node diagram 700 illustrating an example neural network for performing the machine learning or deep learning operation of FIG. 5. The node diagram 700 may be implemented by a computing device such as the second controller 480. For the purpose of the convenience, the description will be made based on the second controller 480 shown in FIG. 4 performing the process flow diagram 600 of FIG. 5 and the node diagram 700 of FIG. 6.

In state 610, the second controller 480 may generate or retrieve a machine learning or deep learning model to be trained. As described above, the second controller 480 may generate the machine learning or deep learning model relating to image recognition from scratch or from an existing relevant model. The second controller 480 may also retrieve the machine learning or deep learning model from the model DB 475 or the memory 490. The second controller 480 may store a relevant machine learning or deep learning model to be trained.

In state 620, the second controller 480 may train the generated or retrieved model with training data sets stored in the training data DB 485. In some embodiments, in training the generated or retrieved model, parameters of the model can be modified until the model produces (or "converges" on) the correct or desired output. For instance, a correct output of an image recognition model may include generating an output that identifies the subject included in the image. This allows the model to evolve by adjusting weight values to affect the output for one or more hidden nodes (see 1420-1450 shown in FIG. 6). The changing of the weight values may be performed through a variety of methods such as random weight updates or backward propagation sometimes referred to as "back propagation." Back propagation includes comparing the expected model output with the obtained model output and then traversing the model to determine the difference between the expected node output that produces the expected model output and the actual node output. An amount of change for one or more of the weight values may be identified using this difference such that the model output more closely matches the expected output.

In some embodiments, the second controller 480 may use a machine learning or deep learning neural network model 1410 shown in FIG. 6 in training the generated or retrieved model. Referring to FIG. 6, the neural network model 1410 includes a plurality of hidden nodes: two nodes I1 (1422) and I2 (1424) at an input layer 1420, three nodes H11 (1432), H12 (1434) and H13 (1436) at a first middle layer 1430, three nodes Hn1 (1442), Hn2 (1444) and Hn3 (1446) at an nth middle layer 1440, and two nodes 1452 (O1) and 1454 (O2) at an output layer 1450. The neural network model 1410 may be trained on input data such as a first input 1460 and a second input 1462 and provide output data such as a first output 1470 and a second output 1472. In some embodiments, one or more of the inputs 1460 and 1462 may be item scanned images or data including, but not limited to, item electronic records, item label data, item layouts, item shipping and service files, barcode formats, item tracking information and item processing equipment data. Although FIG. 6 shows only two inputs and two outputs, depending on the embodiment, more than or less than two inputs can be used, and/or more than or less than two outputs can be used. In some embodiments, each layer may process over, for example, 100, 1,000, 10,000, 100,000, 1,000,000 or greater parameter values. Furthermore, the model 1410 shown includes n middle layers. However, depending on the embodiment, only one middle layer or more than two layers (e.g., 4, 5, 7, 12, 30 or more layers) can be used. To further emphasize the complexity of the models, the number of nodes at each layer is shown as being two or three in FIG. 6, but can be increased to factors of ten or one hundred in some embodiments. The lines connecting each node are each associated with a weight.

Referring back to FIG. 5, in state 630, the second controller 480 may determine whether the training process is complete. The determination may be based on the accuracy of the outputs generated by the identified model for a set of inputs. The accuracy of the outputs may be compared to an accuracy threshold or other target accuracy metric. In some embodiments, the completion may be based on resources spent training such as processor time, processor cycles, memory utilization, or other detectable characteristic of the system.

If it is determined in state 630 that the training process is not complete, the states 620 and 630 may repeat, for example, until the training process is complete. If it is determined in state 630 that the training process is complete, the second controller 480 may test the trained model (state 640). In some embodiments, the testing may be performed using one or more test data sets stored in the test data DB 495. The test data sets may be different from the training data sets stored in the training data DB 485.

In state 650, the second controller 480 may determine whether the performance of the tested model is good or sufficient. The determination of the performance may be based on the accuracy of the outputs generated by the identified model for a set of inputs as described above. If it is determined in state 650 that the performance is not good or sufficient, the states 610-650 may repeat, for example, until the performance is sufficient. If it is determined in state 650 that the performance is good or sufficient, the second controller 480 may store the tested model to be used to fully recognize a barcode even if only a portion of the barcode is computer readable and the remaining portion is damaged, missing, or non-computer readable (state 660). The tested model may be stored in one or more of the model DB 475, the second controller 480 or the memory 490.

In some embodiments, the second controller 480 may use a classification model in performing one or more of the states 610-650 of FIG. 5. Generally, a classification model is a supervised learning approach in which a computer program learns from data input given to it and then uses this learning to classify new observation. This data set may simply be bi-class (like identifying whether the person is male or female or that the email is spam or non-spam) or it may be multi-class too. Some examples of classification problems may include speech recognition, handwriting recognition, biometric identification, document classification, etc. Types of classification algorithms may include, but are not limited to, linear classifiers, logistic regression, Naive Bayes classifier, nearest neighbor, support vector machines, decision trees, boosted trees, random forest and neural networks. The classification model may also provide a confidence indicating a confidence that the resulting classification is the "correct" classification. The analysis may also include character recognition.

Figure 7:
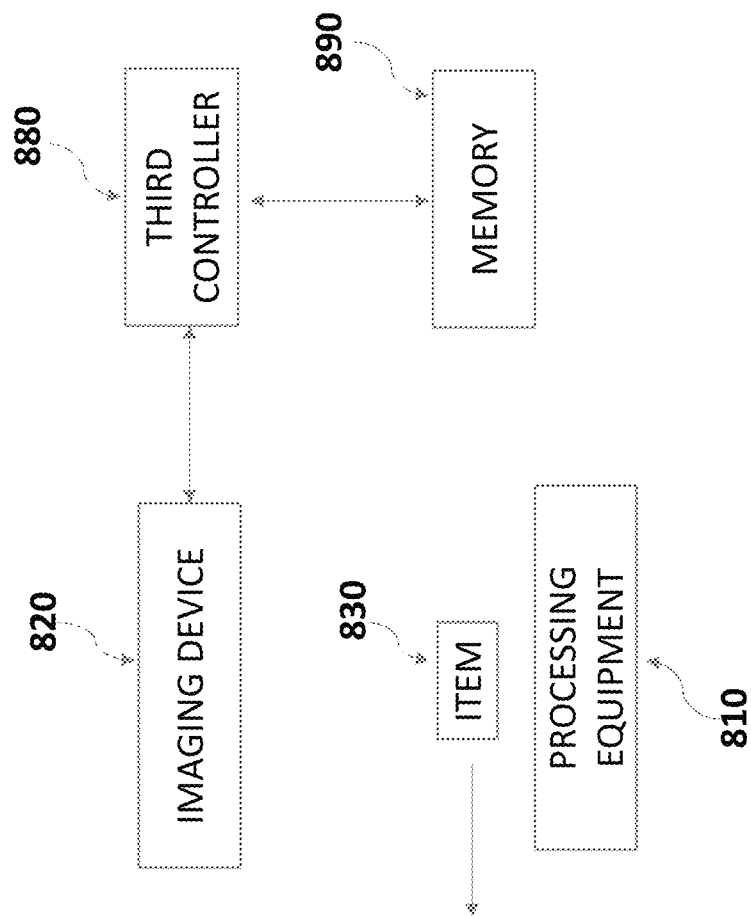
FIG. 7 illustrates an example image processing system for improving item scan rates in a distribution network according to some embodiments.

FIG. 7 illustrates an example image processing system 80 for improving item scan rates in a distribution network according to some embodiments. The image processing system 80 may fully recognize a barcode even if only a portion of the barcode is computer readable and the remaining portion is damaged or not fully computer readable. The image processing system 80 shown in FIG. 7 is merely an example image processing system, and certain elements may be modified or removed, and/or other elements or equipment may be added. Although only one imaging device is shown in FIG. 7, two or more imaging devices can be provided depending on the embodiment.

The image processing system 80 may include item processing equipment 810, an imaging device 820, a third controller 880 and a memory 890. Furthermore, although the first controller 320 shown in FIG. 2, the second controller 480 shown in FIG. 4 and the third controller 880 shown in FIG. 7 may respectively perform building data sets, training a machine learning/deep learning model, and fully recognizing a barcode to improve item scan rates in a distribution network, any one of the controllers 320, 480 and 880 may perform two or more of the above three functions.

The item processing equipment 810 may include a conveyor belt or other component (not shown) that moves items from one location to another. The item processing equipment 810 may automatically process a group of items by conveying each of them past the imaging device 820 captures an image of an item 830 that is being conveyed. The imaging device 820 may capture an entirety or a portion of one side of the item 830 facing the imaging device 820. The imaging device 820 may also capture item information such as barcodes provided on (e.g., attached to, printed on or embedded into) an item such as the item 830. For the purpose of convenience, the description will be made mainly based on the captured image being barcodes provided on an item.

The imaging device 820 may continuously and separately capture images of items being transported in front of the imaging device 820 and output captured images of items. In some embodiments, the captured images or digital data thereof may be stored in the memory 890. In other embodiments, the captured images or digital data thereof may be stored in a memory of the imaging device 820 or a memory of the third controller 880. In other embodiments, the captured images or digital data thereof may be stored in a network memory such as a cloud or other device separately located from the elements 820 and 890. The imaging device 820 may be connected to the third controller 880 either by wire or wirelessly.

The memory 890 may include one or more of the item electronic record DB 342, the item label data DB 344, the item layout DB 346, the item shipping and service file DB 348, the barcode format DB 350, the item tracking DB 352 and the item processing equipment DB 354 shown in FIG. 3.

The third controller 880 may fully recognize the content of a barcode even if only a portion of the barcode is computer readable and the remaining portion is not computer readable by running the trained machine learning or deep learning model on images or data stored in the memory 890 or captured by the imaging device 820 containing barcode related information. The trained model may be stored in the memory 890 or in the third controller 880.

Figure 8:
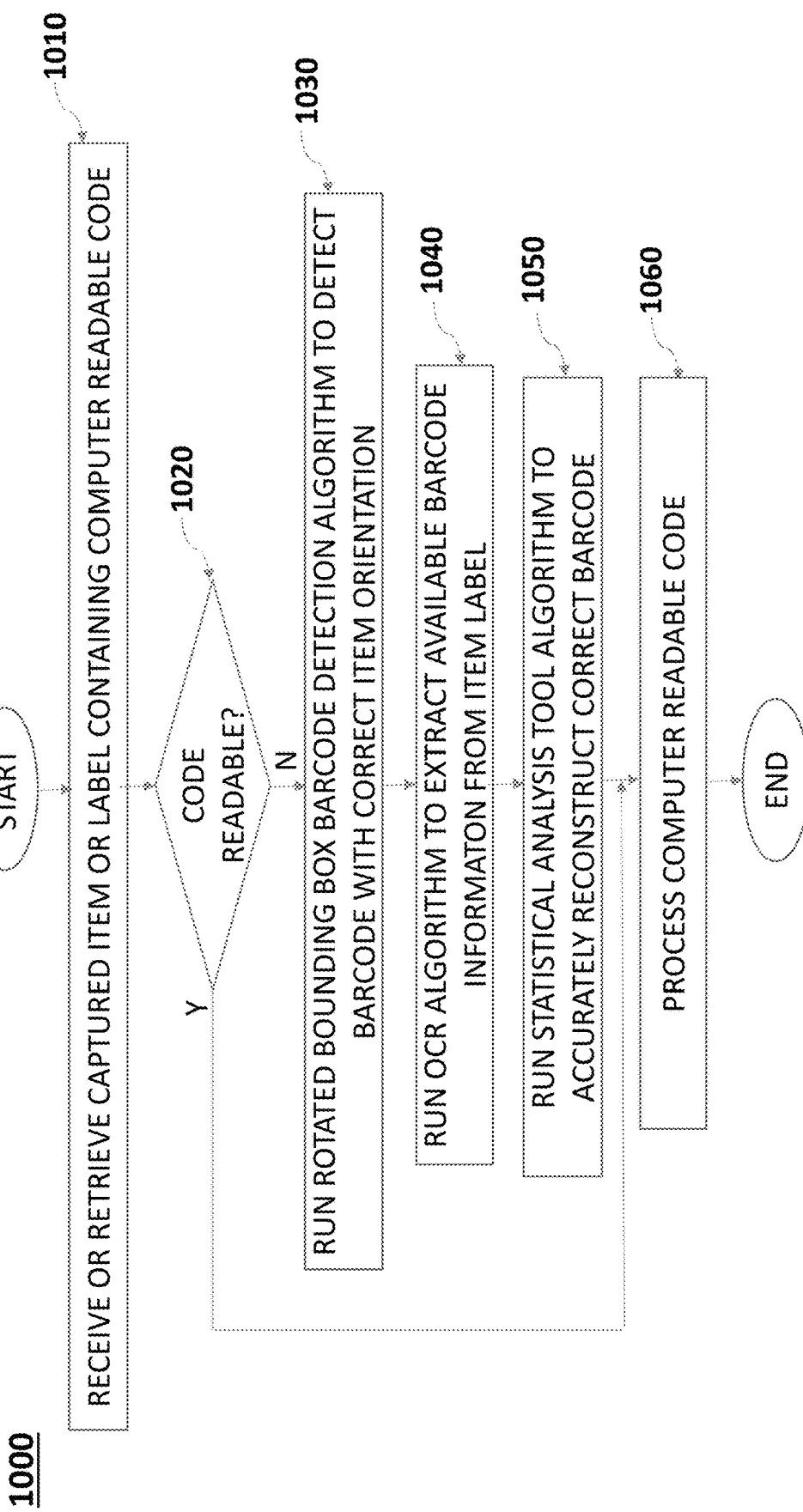
FIG. 8 is a process flow diagram of an exemplary method for improving item scan rates in a distribution network according to some embodiments.

FIG. 8 is a process flow diagram 1000 of a method for improving item scan rates in a distribution network according to some embodiments. For the purpose of convenience, FIG. 8 will be described based on the item information being a computer readable code such as a barcode. The barcode may include one or more of the barcodes described above. The diagram 1000 may be performed by the third controller 880, or may be performed by any other controller, as desired.

In state 1010, the third controller 880 may receive or retrieve a captured item or label containing a computer readable code such as a barcode. In some embodiments, the third controller 880 may receive the captured item or label from the imaging device 820. In other embodiments, the third controller 880 may retrieve the captured item or label from the memory 890.

In state 1020, the third controller 880 may determine whether the computer readable code is fully readable. In some embodiments, the third controller 880 may determine that the computer readable code is not fully readable when the computer readable code is damaged. The third controller 880 may determine that the computer readable code is damaged, when at least a portion of the computer readable code is obscured. For example, the third controller 880 may determine that the computer readable code is obscured or damaged, when the computer readable code is smudged, water damaged, ripped, cut off, torn, and/or overwritten. As another example, the third controller 880 may determine that the computer readable code is damaged, when the computer readable code is wrapped around the item so that the imaging device 820 cannot capture a full image of the computer readable code. In other embodiments, the third controller 880 may determine that the computer readable code is damaged, when at least a portion of the content of the computer readable code is not retrievable. The above are merely examples, and there may be other situations where the third controller 880 may determine that the computer readable code is not fully readable.

If it is determined in state 1020 that the computer readable code is fully readable, the third controller 880 may process the received or retrieved computer readable code (state 1060). The third controller 880 may store the processed computer readable code in the memory 890 or transmit the code to another device.

If it is determined in state 1020 that the computer readable code is not fully readable, the third controller 880 may run a rotated bounding box barcode detection algorithm to detect the barcode with correct item orientation so as to output correct orientation information of the item. The rotated bounding box barcode detection algorithm may allow the second controller 880 to properly run an OCR algorithm or other algorithm, in state 1040. For example, the item may be oriented about 30 degrees to the right (or clockwise) or to the left (or counterclockwise). As another example, the item may be oriented about 90 degrees clockwise or counterclockwise. As another example, the item may be oriented about 180 degrees clockwise or counterclockwise. In some embodiments, the item may be properly oriented. The second controller 880 may output the detected barcode and the item orientation information by running the rotated bounding box barcode detection algorithm. The rotated bounding box barcode detection algorithm may be generated and trained using the method and system described with respect to FIGS. 4-6 before running the rotated bounding box barcode detection algorithm in state 1030.

In state 1040, the third controller 880 may run the OCR algorithm on the output of the rotated bounding box barcode detection algorithm so as to extract an available content from the detected barcode. The third controller 880 may perform the OCR algorithm or other interpretation algorithm, on the barcode with correct item, label, or code orientation. Since the barcode is not fully computer readable, the available content alone may not be sufficient to construct the full content of the barcode. However, the third controller 880 may extract the available content of the barcode in the correctly oriented item by running the OCR algorithm. The OCR algorithm may be generated and trained using the method and system described with respect to FIGS. 4-6 before running the OCR algorithm in state 1040.

In state 1050, the third controller 880 may run a statistical analysis tool algorithm so as to reconstruct a correct barcode from the available content of the barcode and other resources in the system. The other resources may include (but not limited to) one or more of item electronic records, item label data, item layout data, item shipping and service files, barcode formats, item tracking data and item processing equipment data described above with respect to FIG. 3. The statistical analysis tool algorithm may be generated and trained using the method and system described with respect to FIGS. 4-6 before running the statistical analysis tool algorithm in state 1050. The statistical analysis tool algorithm will be described in more detail with respect to FIGS. 9-13. In state 1060, the third controller 880 may process the reconstructed computer readable code.

FIG. 9 is an example barcode format 1070 to be used in a distribution network according to some embodiments. FIGS. 10-13 illustrate process flow diagrams 1100-1400 of example statistical analysis tool algorithms based on the barcode format 1070 according to some embodiments. FIGS. 10-13 are example statistical analysis tool algorithms, and the third controller 880 may run the statistical analysis tool algorithm based on other system resources including (but not limited to) one or more of item electronic records, item label data, item layout data, item shipping and service files, item tracking data and item processing equipment data described above with respect to FIG. 3.

Referring to FIG. 9, the barcode format 1070 shows example components of an intelligent mail barcode. The barcode format 1070 is merely an example and other formats are also possible. The barcode format 1070 may include a barcode identifier 1072, a service type identifier 1074, a mailer ID 1076, a sequence number 1078 and a delivery point ZIP code 1080. The barcode identifier 1072 may be used to a presort identification that is currently printed in human readable form on the optional endorsement line (OEL). The barcode identifier 1072 may have a two-digit value.

The service type identifier 1074 may have a three-digit value that represents both the class of the mail (such as first-class, standard mail, or periodical), and any services requested by the sender. The class of mail may include, but not limited to, one or more of a first-class mail with no services, a standard mail with no services, a first class mail, basic option with destination IMb tracing, a standard mail, basic option with destination IMb tracing, periodicals with manual address correction, a bound printed matter with no services, a business reply mail with no services, a priority mail with no services and a priority mail flat rate with no services, that may respectively have different three-digit values. The service type identifier 1074 may also contain a shipping date of an item.

The mailer ID 1076 may be used to identify the specific business sending the mailing. For example, the mailer ID 1076 may contain information including, but not limited to, shipper information and shipping date. The shipper information may include the name, address and type of the shipper. The type of shipper may be an individual or a company. The shipping date may include the date and time in which the item was shipped. The mailer ID 1076 may be assigned a six- or nine-digit number. Higher volume mailers may be eligible to receive six-digit mailer IDs, which have a larger range of associated sequence numbers. Lower volume mailers may receive nine-digit mailer IDs. To make it possible to distinguish six-digit IDs from nine-digit IDs, all six-digit IDs may begin with a digit between 0 and 8, inclusive, while all nine-digit IDs may begin with the digit 9.

The sequence number (hereinafter to be interchangeably used with a serial number) 1078 may be used to identify the specific recipient or household. The sequence number 1078 may be assigned a six- or nine-digit number. The sequence number 1078 may remain unique for a 45-day period after the mail is sent if a full service discount is claimed, otherwise, it may not be unique. The sequence number 1078 may be either six or nine digits, based on the length of the mailer ID 1076. If the mailer ID 1076 is six digits long, then the sequence number 1078 may be nine digits long, and vice versa, so that there may always be fifteen digits in total when the mailer ID 1076 and the sequence number 1078 are combined. The sequence number 1078 may also contain a shipping date of an item.

The delivery point ZIP code 1080 may be omitted. However, if it is present, the delivery point ZIP code 1080 may be assigned, for example, the five-, nine-, or eleven-digit forms of the ZIP code that may also be encoded in the IMb. The full eleven-digit form may include the standard five-digit ZIP code, the ZIP+4 code, and a two-digit code indicating the exact delivery point. The delivery point ZIP code 1080 may also contain a shipping date of an item.

Figure 10:
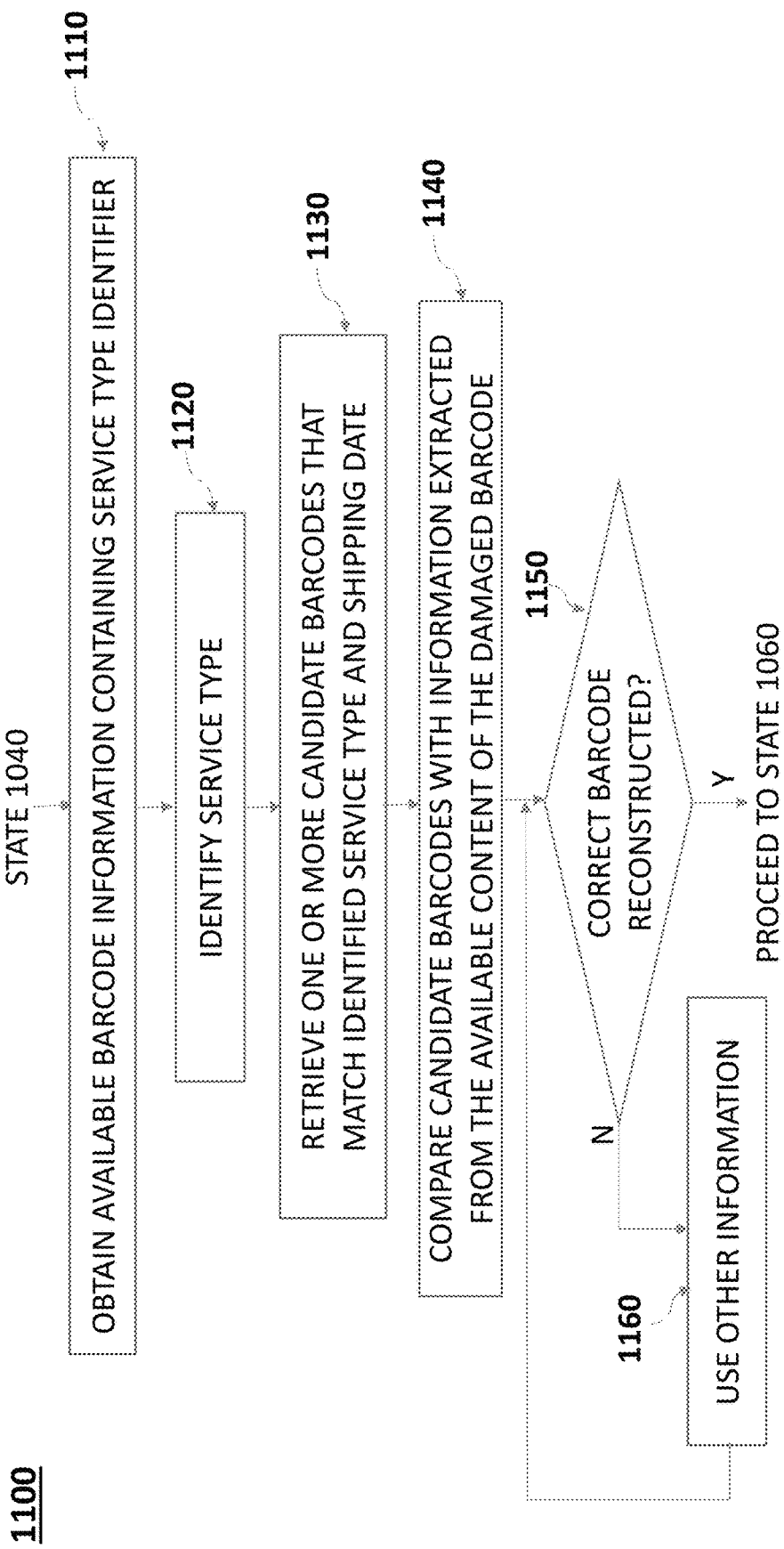
FIG. 10 is a process flow diagram of an example statistical analysis tool algorithm shown in FIG. 8 according to some embodiments.

FIG. 10 is a process flow diagram 1100 of another example statistical analysis tool algorithm shown in FIG. 8 according to some embodiments. In some embodiments, the example statistical analysis tool algorithm shown in FIG. 10 relates to the service type identifier 1074 shown in FIG. 9. The diagram 1100 may be performed by the third controller 880, or may be performed by any other controller, as desired. For the purpose of convenience, the description will be provided based on the third controller 880 performing the flow diagram 1100.

In state 1110, the third controller 880 may obtain the available barcode information containing the service type identifier 1074 as shown in FIG. 9. In some embodiments, the third controller 880 may receive the available barcode information from the output of the OCR algorithm (or OCR results) in state 1040. The third controller 880 may determine first whether the output of the OCR algorithm contains the service type identifier 1074. In these embodiments, the third controller 880 may perform states 1120-1160 only if the output of the OCR algorithm contains the service type identifier 1074.

In state 1120, the third controller 880 may identify the service type from the available barcode information obtained in state 1110. As described with respect to FIG. 10, the service type may include the class of a mail (such as first-class, standard mail, or periodical), and any services requested by a sender. The class of the mail may also include specific type of a class and requested services such as a first-class mail with no services, a standard mail with no services, a first class mail, basic option with destination IMb tracing, a standard mail, basic option with destination IMb tracing, periodicals with manual address correction, a bound printed matter with no services, a business reply mail with no services, a priority mail with no services or a priority mail flat rate with no services described above.

The third controller 880 may additionally identify a shipping date of the time from the service type identifier 1074 or other section such as the mailer ID 1076. In state 1130, the third controller 880 may retrieve one or more candidate barcodes that match the identified service type and the shipping date. In state 1140, the third controller 880 may compare the retrieved candidate barcodes with information extracted from the available content of the barcode that is damaged or otherwise is not fully computer readable.

In state 1150, the third controller 880 may determine whether a correct barcode is identified or reconstructed from the comparison in state 1140. For example, the third controller 880 may determine that the correct barcode is reconstructed when the comparison performed in state 1140 provides an exact barcode (e.g., exact match). In some embodiments, the third controller 880 may determine that there is an exact match, when there is at least one other piece of information (other than the identified service type and the shipping date) match between the available content of the damaged barcode and one of the candidate barcodes. For example, the readable information can contain a service code and a number or digits in the code, such as the serial number or license plate portion of the code. The third controller 880 may query the item code database to identify barcodes have the shipping code and some correlation between the stored code value and the partial read code value. When there is a code with a correlation between a stored code, and the code is for an item which has been inducted on a certain day, originated from a certain place or shipper, etc., the third controller 880 can determine a likely correct complete code, and can process the item accordingly, and without the need for operator manual intervention. When there is only one candidate barcode that matches the identified service type and the shipping date, the third controller 880 may determine that the one candidate barcode is the correct barcode.

In some embodiments, the third controller 880 can retrieve other available information for an item, if known or available, such as an identity of a shipper, a date of induction, a location of induction, whether the item was in a container previously, etc. in some embodiments, the third controller 880 can determine which items are being processed on the item processing equipment using information such as the machine doing the sorting, a sorting time or sorting shift, etc. For example, different sorting processes can happen at different sorting times. In some embodiments the third controller can identify or retrieve the codes of an item sorted/scanned immediately or at some point previous to the damaged/unreadable code, and/or an item sorted/scanned immediately or at some specific point after. In some embodiments, the third controller 880 can determine or receive information that a particular container has been broken down and the items are being processed a on the equipment at a given time. The third controller 880 can receive an indication of where the controller is coming from, a shipper, intended destinations, etc., and this information can be used to determine a likely correct barcode from the known barcodes in the database. Although described here with regard to FIG. 10, it is understood that this can be used in other processes or subprocesses described herein, for example, in FIGS. 11-13.

If it is determined in state 1150 that the correct barcode is not identified or not accurately reconstructed, the third controller 880 may use other information available in the item scan DB 340 shown in FIG. 3 or obtained from performing one or more of the process flow diagrams 1200-1400 (state 1160). If it is determined in state 1150 that the correct barcode is identified or accurately reconstructed, the third controller 880 may proceed to state 1060 shown in FIG. 8.

Figure 11:
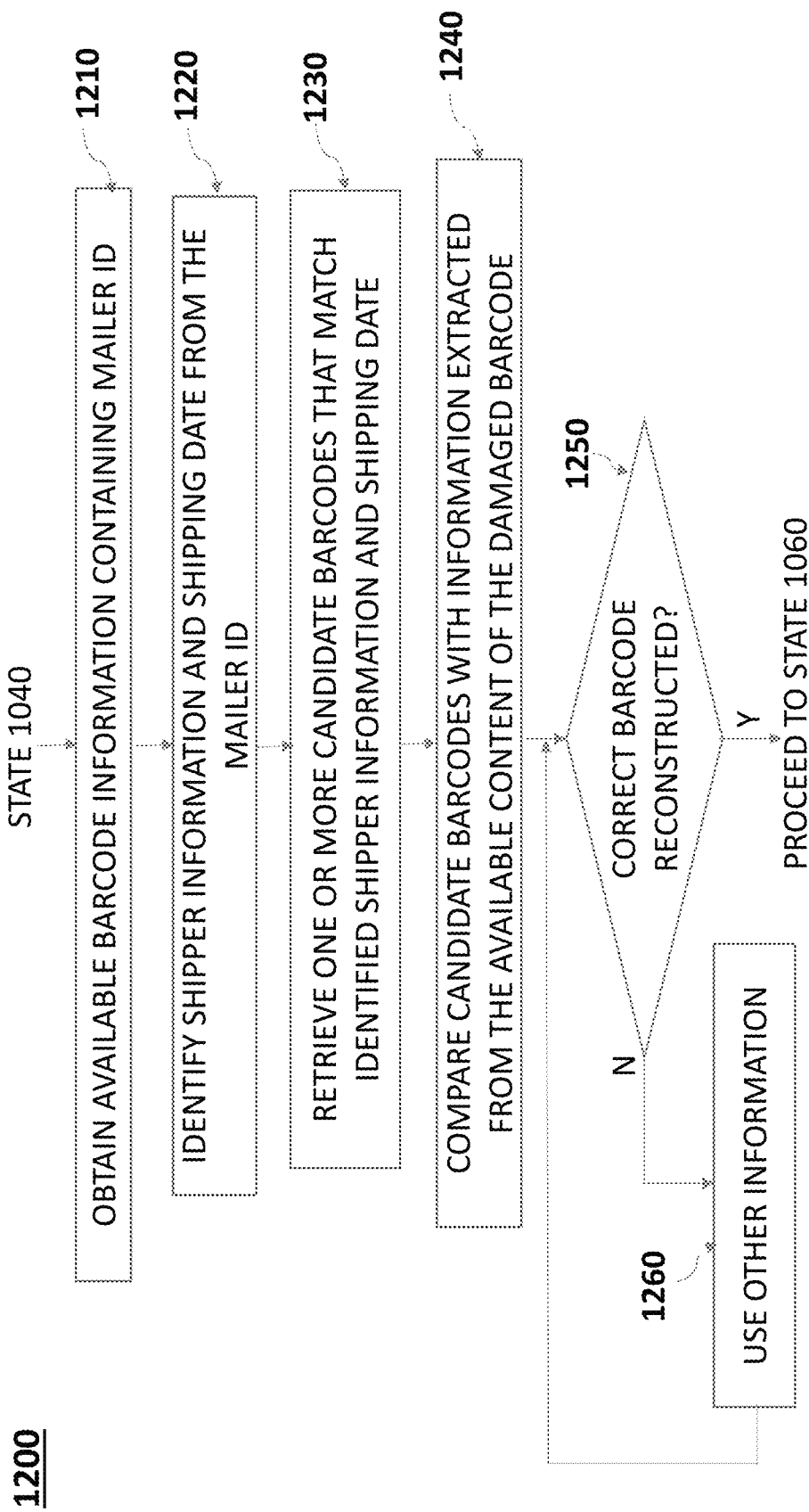
FIG. 11 is a process flow diagram of another example statistical analysis tool algorithm shown in FIG. 8 according to some embodiments.

FIG. 11 is a process flow diagram 1200 of an example statistical analysis tool algorithm shown in FIG. 8 according to some embodiments. In some embodiments, the example statistical analysis tool algorithm shown in FIG. 11 relates to the mailer ID 1076. The diagram 1200 may be performed by the third controller 880, or may be performed by any other controller, as desired. For the purpose of convenience, the description will be provided based on the third controller 880 performing the flow diagram 1200.

In state 1210, the third controller 880 may obtain the available barcode information containing the mailer ID 1076 as shown in FIG. 9. In some embodiments, the third controller 880 may receive the available barcode information from the output of the OCR algorithm (or OCR results) in state 1040. The third controller 880 may determine first whether the output of the OCR algorithm contains the mailer ID 1076. As described above, the mailer ID 1076 may contain information such as shipper information and shipping date. In these embodiments, the third controller 880 may perform states 1220-1260 only if the output of the OCR algorithm contains the mailer ID 1076.

In state 1220, the third controller 880 may identify shipper information and shipping date from the mailer ID. As described with respect to FIG. 9, the mailer ID may include, among other things, shipper information and shipping date.

In state 1230, the third controller 880 may retrieve one or more candidate barcodes that match the identified shipper information and shipping date. In state 1240, the third controller 880 may compare the retrieved candidate barcodes with information extracted from the available content of the barcode that is damaged or otherwise is not fully computer readable.

In state 1250, the third controller 880 may determine whether a correct barcode is identified or reconstructed from the comparison in state 1240. For example, the third controller 880 may determine that the correct barcode is reconstructed when the comparison performed in state 1240 provides an exact barcode (e.g., exact match) obtained based on the shipper information and the shipping date. In some embodiments, the third controller 880 may determine that there is an exact match, when there is at least one other piece of information (other than the shipper information and shipping date) match between the available content of the damaged barcode and one of the candidate barcodes. When there is only one candidate barcode that matches the identified shipper information and shipping date, the third controller 880 may determine that the one candidate barcode is the correct barcode.

If it is determined in state 1250 that the correct barcode is not identified or not accurately reconstructed, the third controller 880 may use other information available in the item scan DB 340 shown in FIG. 3 or obtained from performing one or more of the process flow diagrams 1100, 1300 and 1400 (state 1260). If it is determined in state 1250 that the correct barcode is identified or accurately reconstructed, the third controller 880 may proceed to state 1060 shown in FIG. 8.

Figure 12:
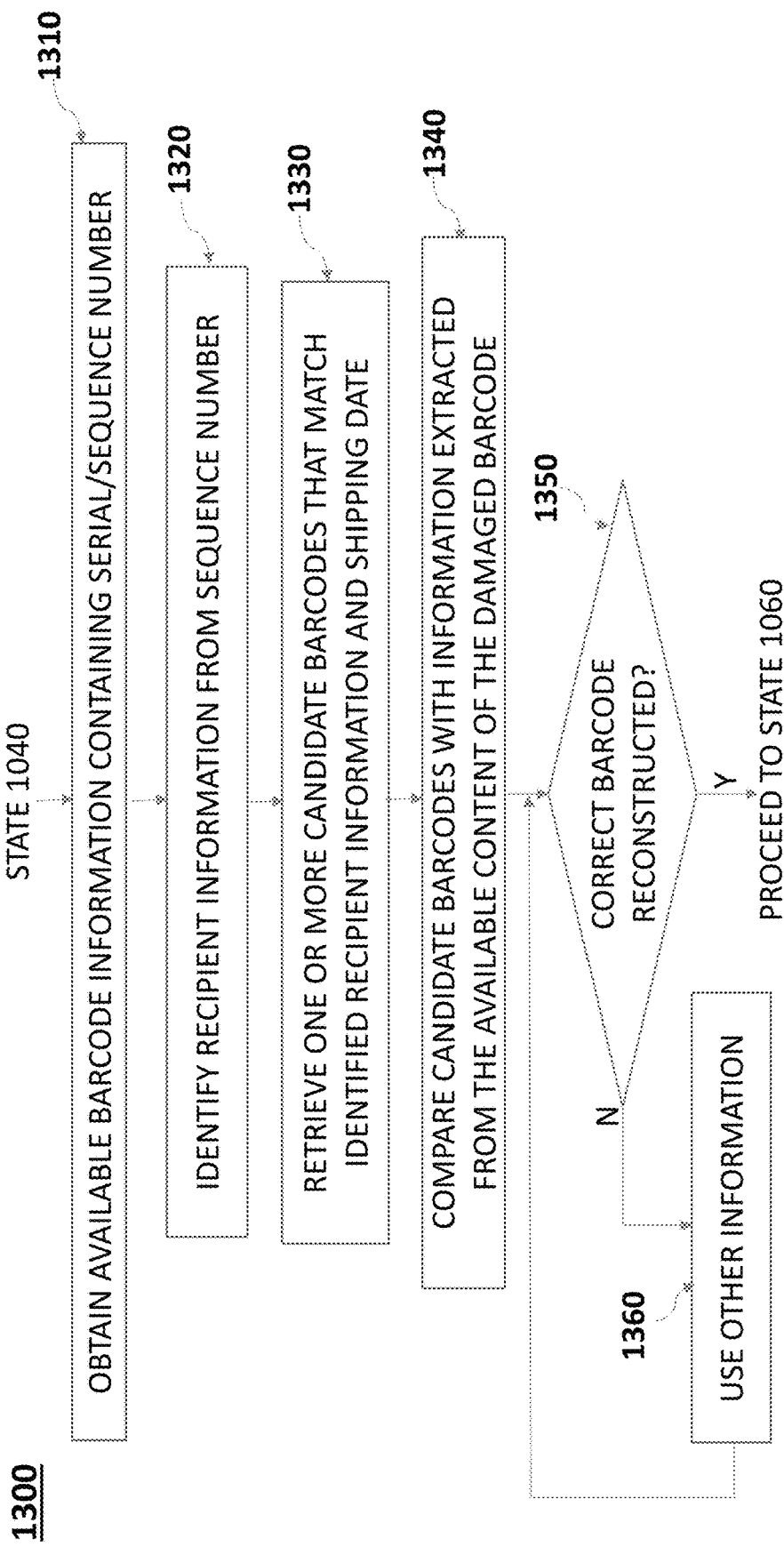
FIG. 12 is a process flow diagram of another example statistical analysis tool algorithm shown in FIG. 8 according to some embodiments.

FIG. 12 is a process flow diagram 1300 of an example statistical analysis tool algorithm shown in FIG. 8 according to some embodiments. In some embodiments, the example statistical analysis tool algorithm 1300 shown in FIG. 12 relates to the sequence number (or serial number) 1078 shown in FIG. 9. The diagram 1300 may be performed by the third controller 880, or may be performed by any other controller, as desired. For the purpose of convenience, the description will be provided based on the third controller 880 performing the flow diagram 1300.

In state 1310, the third controller 880 may obtain the available barcode information containing the sequence number 1078 as shown in FIG. 9. In some embodiments, the third controller 880 may receive the available barcode information from the output of the OCR algorithm (or OCR results) in state 1040. The third controller 880 may determine first whether the output of the OCR algorithm contains the sequence number 1078. In these embodiments, the third controller 880 may perform states 1320-1360 only if the output of the OCR algorithm contains the sequence number 1078.

In state 1320, the third controller 880 may identify recipient information from the sequence number 1078. As described with respect to FIG. 9, the sequence number 1078 may contain the specific recipient or household. The third controller 880 may additionally identify shipping date from the sequence number 1078 or other section such as the mailer ID 1076.

In state 1330, the third controller 880 may retrieve one or more candidate barcodes that match the identified recipient information and shipping date. In state 1340, the third controller 880 may compare the retrieved candidate barcodes with information extracted from the available content of the barcode that is damaged or otherwise is not fully computer readable.

In state 1350, the third controller 880 may determine whether a correct barcode is identified or reconstructed from the comparison in state 1340. For example, the third controller 880 may determine that the correct barcode is reconstructed when the comparison performed in state 1340 provides an exact barcode (e.g., exact match), or a threshold match or a partial match obtained based on the recipient information and shipping date. In some embodiments, the third controller 880 may determine that there is an exact match, when there is at least one other piece of information (other than the recipient information and shipping date) match between the available content of the damaged barcode and one of the candidate barcodes. When there is only one candidate barcode that matches the identified recipient information and shipping date, the third controller 880 may determine that the one candidate barcode is the correct barcode.

If it is determined in state 1350 that the correct barcode is not identified or not accurately reconstructed, the third controller 880 may use other information available in the item scan DB 340 shown in FIG. 3 or obtained from performing one or more of the process flow diagrams 1100, 1200 and 1400 (state 1360). If it is determined in state 1350 that the correct barcode is identified or accurately reconstructed, the third controller 880 may proceed to state 1060 shown in FIG. 8.

Figure 13:
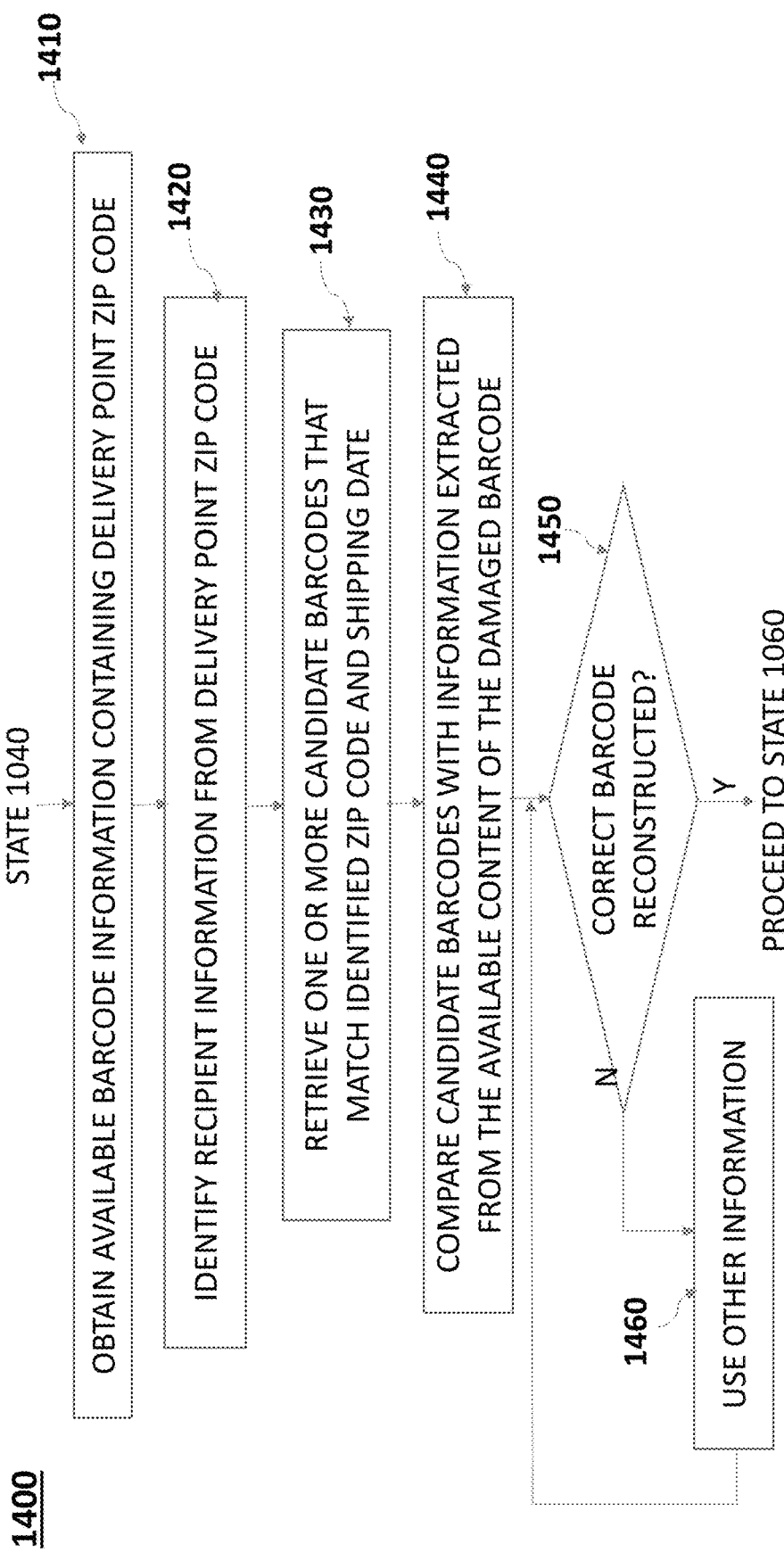
FIG. 13 is a process flow diagram of another example statistical analysis tool algorithm shown in FIG. 8 according to some embodiments.

FIG. 13 is a process flow diagram 1400 of another example statistical analysis tool algorithm shown in FIG. 8 according to some embodiments. In some embodiments, the example statistical analysis tool algorithm 1400 shown in FIG. 13 relates to the delivery point ZIP code 1080 shown in FIG. 9. The diagram 1400 may be performed by the third controller 880, or may be performed by any other controller, as desired. For the purpose of convenience, the description will be provided based on the third controller 880 performing the flow diagram 1400.

In state 1410, the third controller 880 may obtain the available barcode information containing the delivery point ZIP code 1080 as shown in FIG. 9. In some embodiments, the third controller 880 may receive the available barcode information from the output of the OCR algorithm (or OCR results) in state 1040. The third controller 880 may determine first whether the output of the OCR algorithm contains the delivery point ZIP code 1080, and proceed to states 1420-1460 only if the output of the OCR algorithm contains the delivery point ZIP code 1080.

In state 1420, the third controller 880 may identify recipient information from the delivery point ZIP code 1080. The third controller 880 may additionally identify shipping date from the delivery point ZIP code 1080 or other section such as the mailer ID 1076.

In some embodiments, where a container of items is being broken down into component packages and the unreadable or damaged barcode has come from a container, the third controller can access tracking or scan information to identify the previous scan information, such as the previous location of the container in which the item was located. The prior location can be used in addition to the information here to limit the number of candidate barcodes. For example, if the prior scan location was a first geographic area, candidate barcodes for areas that are not related to, are far from, or which would not be in the shipping path of the prior scan location of the container can be excluded or given less weight in determining the candidate barcodes.

In state 1430, the third controller 880 may retrieve one or more candidate barcodes that match the identified delivery point ZIP code and shipping date. In state 1440, the third controller 880 may compare the retrieved candidate barcodes with information extracted from the available content of the barcode that is damaged or otherwise is not fully computer readable.

In state 1450, the third controller 880 may determine whether a correct barcode is identified or reconstructed from the comparison in state 1440. For example, the third controller 880 may determine that the correct barcode is reconstructed when the comparison performed in state 1440 provides an exact barcode (e.g., exact match) obtained based on the delivery point ZIP code and shipping date. In some embodiments, the third controller 880 may determine that there is an exact match, when there is at least one other piece of information (other than the delivery point ZIP code and shipping date) match between the available content of the damaged barcode and one of the candidate barcodes.

If it is determined in state 1450 that the correct barcode is not identified or not accurately reconstructed, the third controller 880 may use other information available in the item scan DB 340 shown in FIG. 3 or obtained from performing one or more of the process flow diagrams 1100-1300 (state 1460). If it is determined in state 1450 that the correct barcode is identified or accurately reconstructed, the third controller 880 may proceed to state 1060 shown in FIG. 9.

Figure 14:
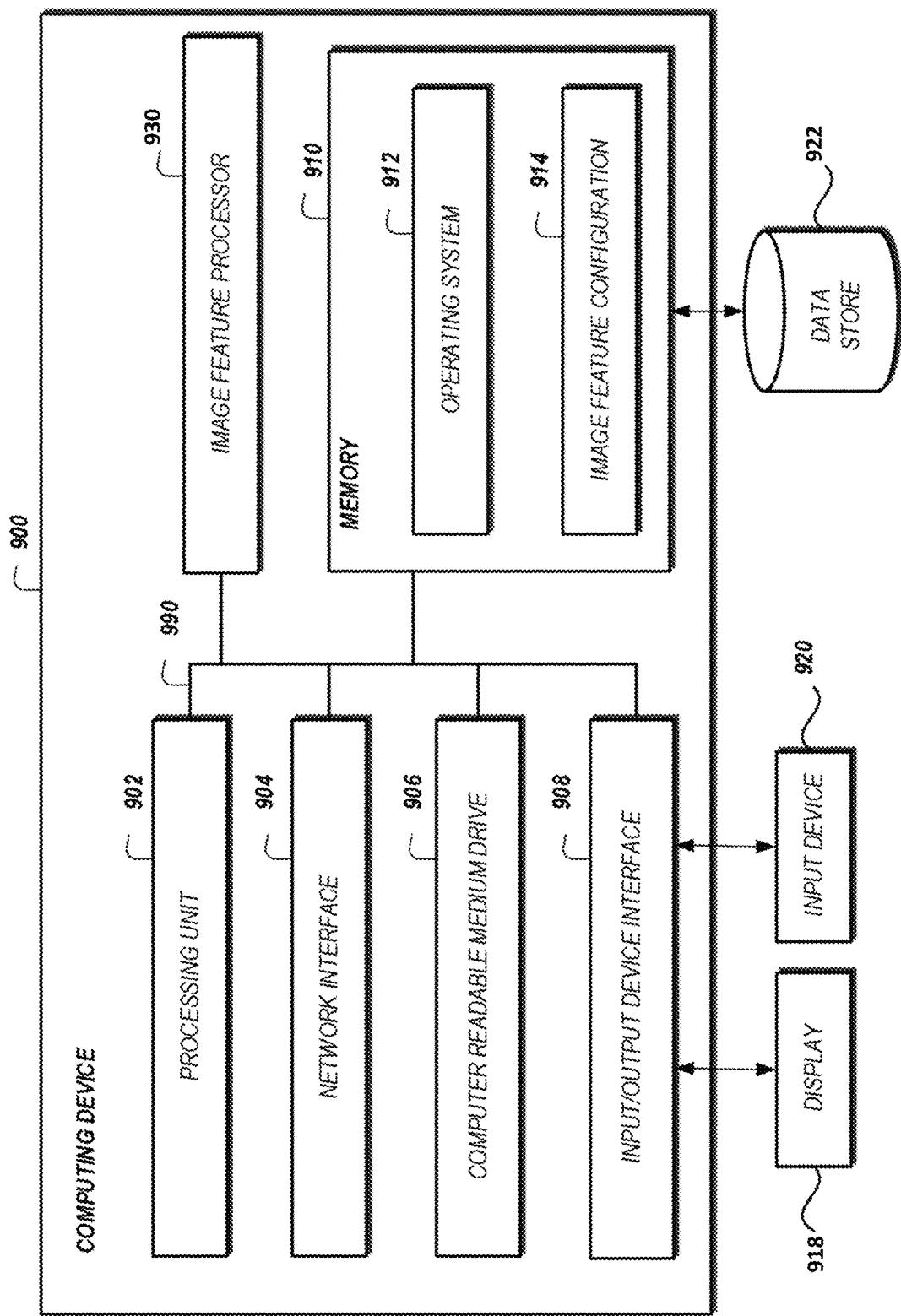
FIG. 14 is a block diagram of an example controller illustrated in FIGS. 2, 4 and 7 according to some embodiments.

FIG. 14 is a block diagram of an embodiment of a computing device 900 for implementing the process flow diagrams 600, 1000 and 1100-1400 described above with respect to FIGS. 5, 8 and 10-13. FIG. 14 is merely an example block diagram of the computing device 900, and certain elements may be removed, other elements added, two or more elements combined or one element can be separated into multiple elements depending on the specification and requirements.

The computing device 900 can be a server or other computing device, and can include a processing unit or processor 902, an image feature processor 930, a network interface 904, a computer readable medium drive 906, an input/output device interface 908, and a memory 910. In some embodiments, the computing device 900 may implement the features of one or more of the optical scanners 310/820 and the controllers 320/480/880. In other embodiments, at least some elements of the computing device 900 may be included in one or more of the optical scanners 310/820 and the controllers 320/480/880 to perform an entirety or part of the flow diagrams shown in FIGS. 5, 8 and 10-13. In still other embodiments, the computing device 900 may be in data communication with one or more of the optical scanners 310/820 and the controllers 320/480/880 to perform an entirety or part of the procedures shown in FIGS. 5, 8 and 10-13.

The network interface 904 can provide connectivity to one or more networks or computing systems. The network interface 904 can receive information and instructions from other computing systems or services via the network interface 904. The network interface 904 can also store data directly to the memory 910. The processing unit 902 can communicate to and from the memory 910 and output information to an optional display 918 via the input/output device interface 908. The input/output device interface 908 can also accept input from the optional input device 920, such as a keyboard, mouse, digital pen, microphone, mass storage device, etc.

The memory 910 may contain computer program instructions that the processing unit 902 executes in order to implement one or more of the embodiments described above. The memory 910 generally includes RAM, ROM, and/or other persistent, non-transitory computer readable media. The memory 910 can store an operating system 912 that provides computer program instructions for use by the processing unit 902 or other elements included in the computing device in the general administration and operation of the computing device 900. The memory 910 can further include computer program instructions and other information for implementing aspects of the present disclosure.

For example, in one embodiment, the memory 910 includes an image feature configuration 914. The image feature configuration 914 may include one or more desired orientations for displaying different types of items, regular expressions for sets of characters including the routing information (e.g., ZIP code), area(s) of pre-printed packaging material that may include address information or other routing information, or other information supporting the image based routing of items described herein. The image feature configuration 914 may store specific values for a given configuration. The image feature configuration 914 may, in some embodiments, store information for obtaining values for a given configuration. For example, an address information extraction service implementing the regular expressions for identifying the address information or identify destination location information extracted from an image may be specified as a network location (e.g., URL) in conjunction with username and password information to access the service. In such embodiments, a message including the extracted text (or portion thereof) may be provided to the service. A response message may include the extracted address or destination location information, if available.

The memory 910 may also include or communicate with one or more auxiliary data stores, such as data store 922. The data store 922 may electronically store data regarding mail pieces, image files, or finalization results therefore.

The elements included in the computing device 900 may be coupled by a bus 990. The bus 990 may be a data bus, communication bus, or other bus mechanism to enable the various components of the computing device 900 to exchange information.

In some embodiments, the computing device 900 may include additional or fewer components than are shown in FIG. 14. For example, a computing device 900 may include more than one processing unit 902 and computer readable medium drive 906. In another example, the computing device 900 may not be coupled to a display 918 or an input device 920. In some embodiments, two or more computing devices 900 may together form a computer system for executing features of the present disclosure.

In some embodiments, a non-transitory computer readable medium having stored thereon instructions which when executed by at least one computing device performs all or a portion of the methods described.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. An image processing system can be or include a microprocessor, but in the alternative, the image processing system can be or include a controller, microcontroller, or state machine, combinations of the same, or the like configured to generate and analyze indicator feedback. An image processing system can include electrical circuitry configured to process computer-executable instructions. Although described herein primarily with respect to digital technology, an image processing system may also include primarily analog components. For example, some or all of the image file analysis and rotation notation features described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in specifically tailored hardware, in a specialized software module executed by an image processing system, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An exemplary storage medium can be coupled to the image processing system such that the image processing system can read information from, and write information to, the storage medium. In the alternative, the storage medium can be integral to the image processing system. The image processing system and the storage medium can reside in an application specific integrated circuit (ASIC). The ASIC can reside in an access device or other monitoring device. In the alternative, the image processing system and the storage medium can reside as discrete components in an access device or other item processing device. In some embodiments, the method may be a computer-implemented method performed under the control of a computing device, such as an access device or other item processing device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some embodiments, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some embodiments, include a signal utilized to transmit one or more representations of the information. While recited in the singular, it will be understood that a message may be composed, transmitted, stored, received, etc. in multiple parts.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for scanning items in a distribution network, the system comprising:
   one or more databases storing barcode information for a plurality of barcodes;
   a scanner located at a distribution network facility, the scanner configured to scan an item and generate scan information, the scan information comprising barcode information, adjacency information identifying at least one other item processed before or after the item, and a distribution network facility identifier;
   one or more processors in data communication with the one or more databases and the scanner, and configured to:
   extract barcode information from the scan information, wherein the extracted barcode information comprises a computer-readable portion and a non-computer-readable portion;
   identify the computer-readable portion of the extracted barcode information;
   identify, in the one or more databases, a set of candidate barcodes from the plurality of barcodes based on the adjacency information and the distribution network facility identifier;
   retrieve, from the one or more databases, the set of candidate barcodes of the plurality of barcodes that at least partially match the identified computer-readable portion of the extracted barcode information;
   and
   identify a likely barcode from the set of candidate barcodes based on the adjacency information and the distribution network facility identifier.

2. The system of claim 1, wherein at least one of the one or more databases further stores item information for a plurality of items and an association between each of the plurality of items with one of the plurality of barcodes.

3. The system of claim 2, wherein at least one of the one or more processors is further configured to identify the likely barcode by comparing item information for the items of the plurality of items associated with the one or more candidate barcodes.

4. The system of claim 2, wherein the scan information further comprises facility information associated with the scanner, and wherein the item information comprises an expected item location for each of the plurality of items.

5. The system of claim 4, wherein at least one of the one or more processors is further configured to:
   identify a subset of barcodes of the plurality of barcodes which are associated with expected item locations corresponding to the facility information associated with the scanner; and
   retrieve the one or more candidate barcodes from the identified subset of barcodes.

6. The system of claim 4, wherein at least one of the one or more processors is further to configured to identify the likely barcode by comparing the expected item information of the items of the plurality of items associated with the one or more candidate barcodes and the facility information associated with the scanner.

7. The system of claim 1, wherein the barcode information comprises one or more bar code elements, and wherein the identified computer-readable portion of the extracted barcode information corresponds to at least one of the one or more barcode elements.

8. The system of claim 7, wherein each of the one or more barcode elements comprises: a mailer ID, a sequence number, a service type identifier, recipient information, or a delivery point identifier.

9. The system of claim 7, wherein the one or more barcode elements comprise a mailer ID, a sequence number, a service type identifier, and a delivery point identifier, associated with the item, and wherein at least one of the one or more processors is configured to analyze two or more of the mailer ID, the sequence number, the service type identifier, or the delivery point identifier to identify the non-computer-readable portion of the extracted barcode information.

10. The system of claim 1, wherein at least one of the one or more processors is further configured to reconstruct the likely barcode from the extracted barcode information and the barcode information associated with the likely barcode.

11. A method for scanning items in a distribution network, the method comprising:
storing, in one more databases, barcode information for a plurality of barcodes;
receive, from a scanner located at a distribution network facility, the scanner, scan information from a scan of an item, the scan information comprising barcode information, adjacency information identifying at least one other item processed before or after the item, and a distribution network facility identifier;
extracting, by one or more processors, barcode information from the scan information, wherein the extracted barcode information comprises a computer-readable portion and a non-computer-readable portion;
identifying, by the one or more processors, the computer-readable portion of the extracted barcode information;
identifying, in the one or more databases, a set of candidate barcodes from the plurality of barcodes based on the adjacency information and the distribution network facility identifier;
retrieving, by the one or more processors, the set of candidate barcodes of the plurality of barcodes that at least partially match the identified computer-readable portion of the extracted barcode information;
identifying a likely barcode from the set of candidate barcodes based on the adjacency information and the distribution network facility identifier.

12. The method of claim 11, further comprising storing, in the one or more databases, item information for a plurality of items and an association between each of the plurality of items with one of the plurality of barcodes.

13. The method of claim 12, wherein identifying the likely barcode further comprises comparing item information for the items of the plurality of items associated with the one or more candidate barcodes.

14. The method of claim 12, wherein the scan information further comprises facility information associated with the scanner, and wherein the item information comprises an expected item location for each of the plurality of items.

15. The method of claim 14, further comprising:
identifying a subset of barcodes of the plurality of barcodes which are associated with expected item locations corresponding to the facility information associated with the scanner; and
retrieving the one or more candidate barcodes from the identified subset of barcodes.

16. The method of claim 14, wherein identifying the likely barcode comprises comparing the expected item information of the items of the plurality of items associated with the one or more candidate barcodes and the facility information associated with the scanner.

17. The method of claim 11, wherein the barcode information comprises one or more barcode elements, and wherein the identified computer-readable portion of the extracted barcode information corresponds to at least one of the one or more barcode elements.

18. The method of claim 17, wherein each of the one or more barcode elements comprises: a mailer ID, a sequence number, a service type identifier, recipient information, or a delivery point identifier.

19. The method of claim 11, further comprising: reconstructing the likely barcode from the extracted barcode information and the barcode information associated with the likely barcode.

20. The method of claim 19, further comprising attaching the reconstructed likely barcode to the item.

21. A non-transitory computer readable medium storing instructions, which, when executed by one or more processors, causes the one or more processors to perform the method of claim 10.

* * * * *